US011892620B2

United States Patent
Paquet et al.

(10) Patent No.: US 11,892,620 B2
(45) Date of Patent: Feb. 6, 2024

(54) TARGET DEVICE FOR CHARACTERIZING TERAHERTZ IMAGING SYSTEMS

(71) Applicant: INSTITUT NATIONAL D'OPTIQUE, Québec (CA)

(72) Inventors: Alex Paquet, Québec (CA); François Berthiaume, Québec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 95 days.

(21) Appl. No.: 17/355,967

(22) Filed: Jun. 23, 2021

(65) Prior Publication Data

US 2021/0396574 A1 Dec. 23, 2021

Related U.S. Application Data

(60) Provisional application No. 63/042,710, filed on Jun. 23, 2020.

(51) Int. Cl.
*G02B 26/08* (2006.01)
*G01J 1/04* (2006.01)
*G01N 21/3581* (2014.01)
*G01N 21/552* (2014.01)

(52) U.S. Cl.
CPC ........ *G02B 26/0883* (2013.01); *G01J 1/0437* (2013.01); *G01J 1/0448* (2013.01); *G01J 1/0477* (2013.01); *G01N 21/3581* (2013.01); *G01N 21/552* (2013.01)

(58) Field of Classification Search
CPC .. G02B 26/0883; G01J 1/0437; G01J 1/0448; G01J 1/0477; G01N 21/3581; G01N 21/552
See application file for complete search history.

(56) References Cited

U.S. PATENT DOCUMENTS

| 6,876,322 | B2 | 4/2005 | Keller |
| 10,247,842 | B2 | 4/2019 | Marchese et al. |
| 10,254,170 | B2 | 4/2019 | Barber |
| 2016/0198985 | A1* | 7/2016 | Park .................... A61B 5/1455 356/446 |
| 2016/0216371 | A1 | 7/2016 | Ahmed et al. |
| 2018/0224538 | A1 | 8/2018 | Ahmed et al. |
| 2020/0249488 | A1* | 8/2020 | Nakanishi ................ G01J 3/42 |
| 2021/0096066 | A1* | 4/2021 | Piccoli ................... G01N 21/21 |

OTHER PUBLICATIONS

Brady et al., "Penetration of Microwaves into the Rarer Medium in Total Reflection", Journal of the Optical Society of America, 1960, vol. 50, No. 11, pp. 1080-1084.
(Continued)

*Primary Examiner* — David P Porta
*Assistant Examiner* — Casey Bryant
(74) *Attorney, Agent, or Firm* — MH2 TECHNOLOGY LAW GROUP, LLP

(57) ABSTRACT

Target devices for characterizing terahertz imaging systems are provided. The target devices include a terahertz resolution pattern having spatially distributed resolution features and one or more prism assemblies configured to provide a variable contrast level within the resolution features when used with terahertz radiation. Each prism assembly includes first and second prisms arranged in a Frustrated Total Internal Reflection (FTIR) configuration.

20 Claims, 39 Drawing Sheets

(56) References Cited

OTHER PUBLICATIONS

E. Hetch, "4.8 Optical Properties of Metals", Optics, (Addison-Wesley, San Francisco, CA), 2001, 4th ed. p. 127.
Beddows et al., "Application of frustrated total internal reflection devices to analytical laser spectroscopy", Applied Optics, 2003, vol. 42, No. 30, pp. 6006-6015.
Citroen et al., "Noise equivalent reflectance difference (NERD) vs. spatial resolution (SR) as a good measure for system performances", Proceedings of SPIE, vol. 7087, Aug. 25, 2008, Remote Sensing Engineering, pp. 708705-1-708705-11.
Sequestim Limited, "Technology-Sequestim-Express solutions for the Future", 2020, https://sequestim.com/technology/, 5 pages, printed Sep. 15, 2021.
Imatest, "Using Stepchart", Documentation—Current v2021.1, https://www.imatest.com/docs/stepchart/, 25 pages, printed Sep. 15, 2021.
EMVA—European Machine Vision Association, "EMVA 1288 is the Standard for Measurement and Presentation of Specifications for Machine Vision Sensors and Cameras", EMVA 1288, https://www.emva.org/standards-technology/emva-1288/, 5 pages, printed Sep. 15, 2021.

* cited by examiner

OECF test chart defined in ISO 14524

(PIROR ART)

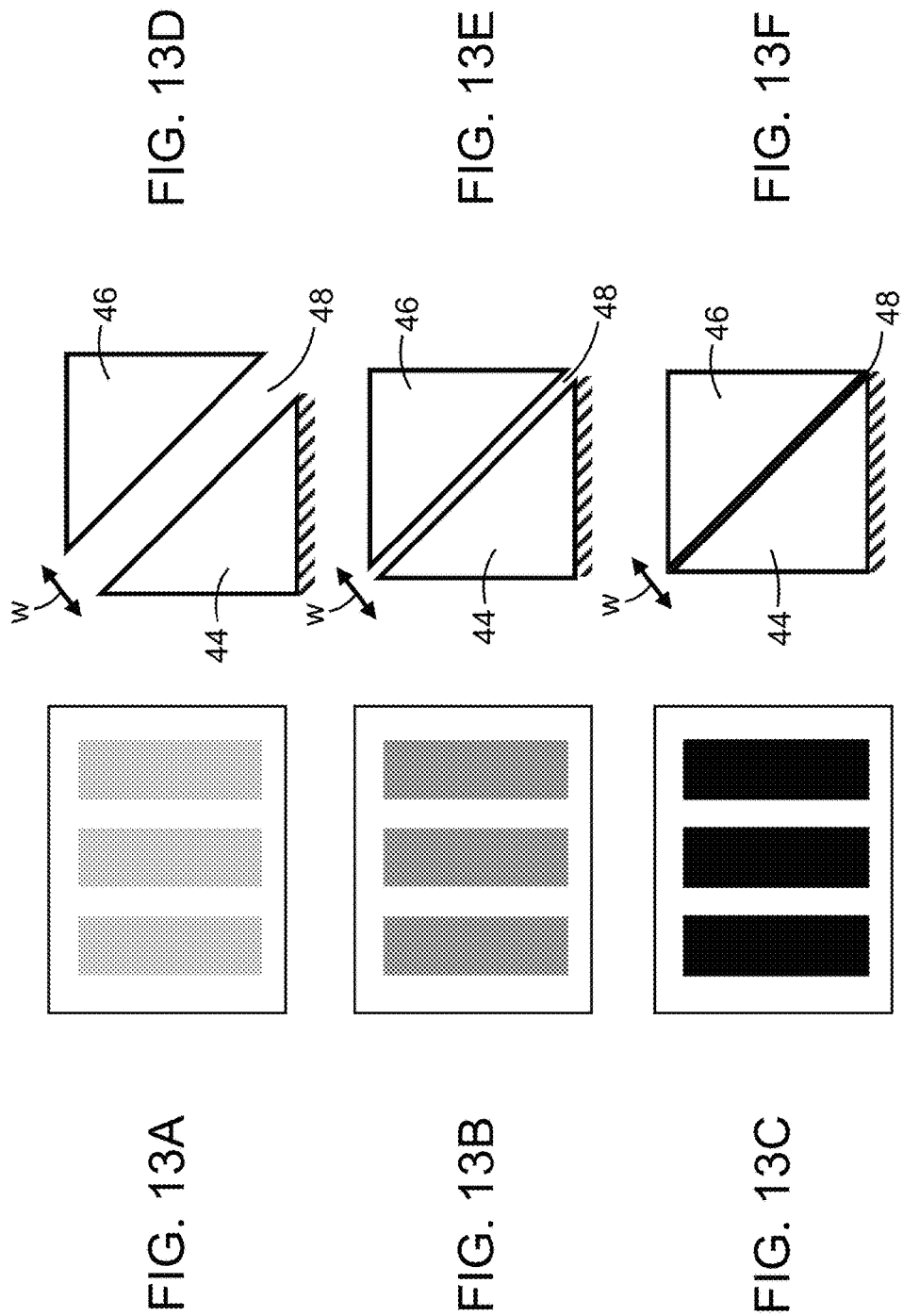

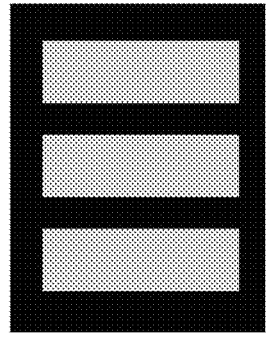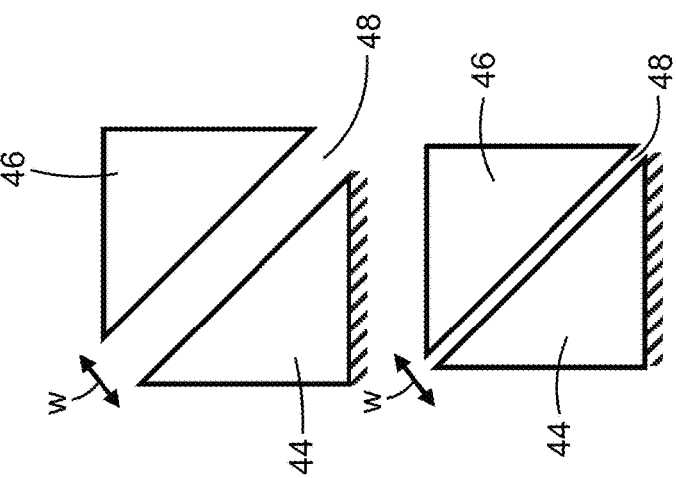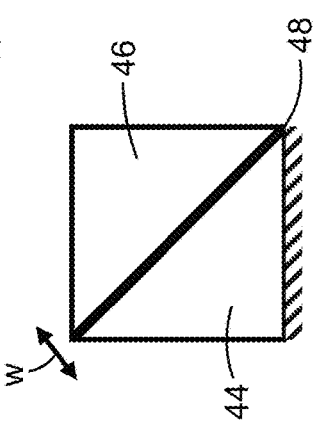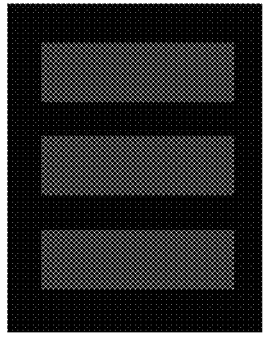
FIG. 14A  FIG. 14B  FIG. 14C  FIG. 14D  FIG. 14E  FIG. 14F

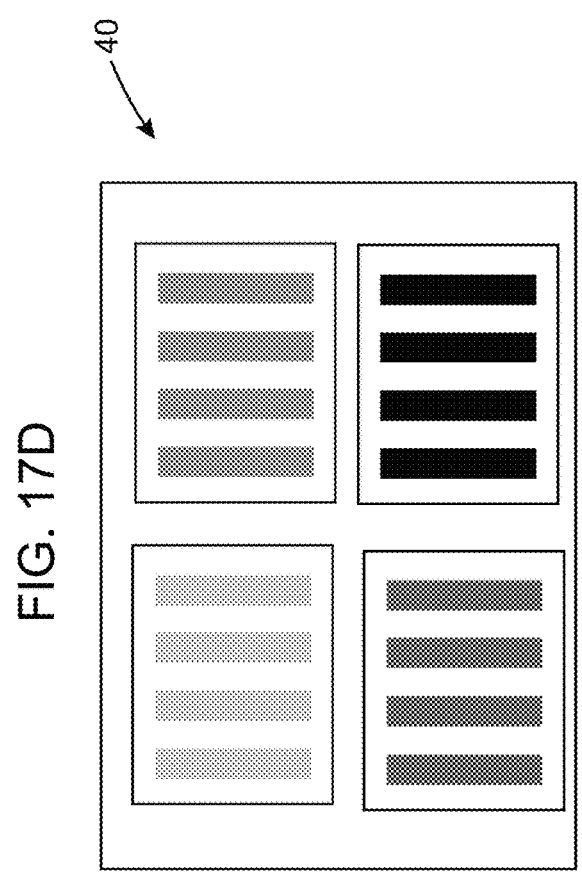
FIG. 17D
FIG. 17E
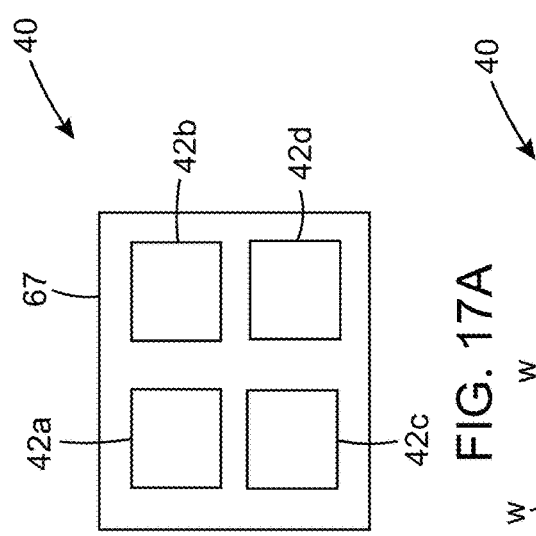
FIG. 17A
FIG. 17B
FIG. 17C

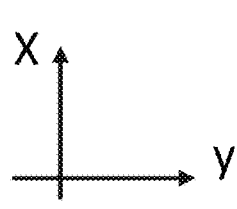
FIG. 20A
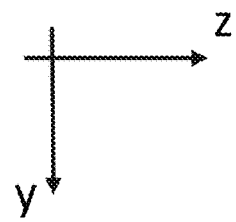
FIG. 20D
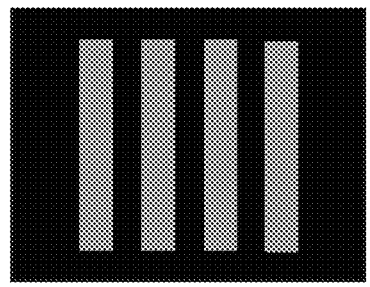
FIG. 20B
FIG. 20E
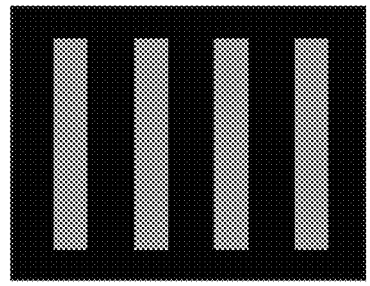
FIG. 20C
FIG. 20F
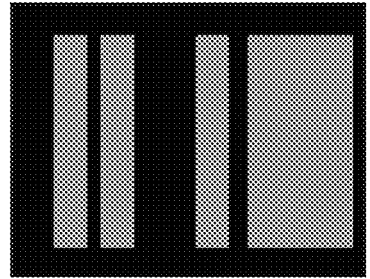
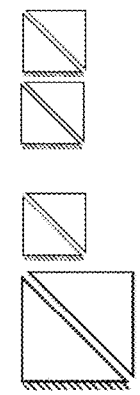

TARGET DEVICE FOR CHARACTERIZING TERAHERTZ IMAGING SYSTEMS

CROSS REFERENCE TO RELATED APPLICATIONS

This application claims the benefit of, and relies on the filing date of, U.S. Provisional Patent Application No. 63/042,710, filed 23 Jun. 2020, the entire disclosure of which is incorporated herein by reference.

TECHNICAL FIELD

The technical field generally relates to performance assessment of imaging systems and more particularly concerns a target device for characterizing terahertz imaging systems.

BACKGROUND

Some imaging systems operate with radiation of optical frequency in the terahertz (THz) and sub-terahertz range, corresponding to wavelengths of the order of millimeters. Radiation with such wavelengths can penetrate through opaque materials such as clothing and cardboard boxes, while being safer than x-ray radiation for humans. Terahertz imaging is of interest in many seeing-through applications for security purposes. For example, concealed weapon detection systems used in many airport security gates are operating in the millimeter-wave band.

Various terahertz scanning configurations are known in the art. For example, U.S. Pat. No. 6,876,322 discloses cylindrical-shaped scanning systems requiring the subject to stand still into a specific pose while the system performs a complete scan. Rodhe and Schwarz have developed systems where subjects walk through in a linear fashion (U.S. patent application no. 2018/0224538) or based on a surrounding cylindrical geometry (U.S. patent application no. 2016/0216371). These systems are referred to as active imaging systems, since an external source of millimeter-wave radiation shines on the target and a detector captures a part of the radiation reflected off the target for image processing. Active imaging systems can also be configured to operate in transmission mode for inspection of objects such as mail or small parcels (U.S. Pat. No. 10,247,842). Other alternatives are passive millimeter-wave systems, in which the source of millimeter waves is the human body itself, and a very-high sensitivity sensor detects a contrast between radiation received directly from the body and a shadow from a concealed object (see https://sequestim.com/technology/). All these systems share a common aspect of using radiation of optical frequency in the terahertz (including sub-THz) range.

In the context of imaging in the visible spectral range, the optoelectronic conversion function (OECF) of the camera of an imaging system can be measured by using test charts displaying patches of different gray levels. An OECF test chart defined in the ISO 14524 standard is presented in FIG. 1 (PRIOR ART). Various arrangements of standard test charts for resolution and other metrics can be found at http://www.imatest.com/docs/stepchart/.

Similar charts are also used for measuring noise statistical properties (ISO 15739:2017) and their relationship to intensity (SNR). Using a similar procedure, the photon transfer curve can also be retrieved (see EMVA 1288 procedure: https://www.emva.org/standards-technology/emva-1288/). The OECF test charts can also be used for dynamic range (DR) assessment. For thermal cameras, imaging a blackbody set at different temperature (intensity) levels and computing the noise standard deviation for each of these is part of the noise equivalent temperature difference measurement (NETD). The SNR, NETD and dynamic range are inputs to image range compression algorithms.

Terahertz imaging systems also require a quantitative characterization of their imaging quality and performances. This is needed in order to provide metrics for specification sheets at the time of system design and fabrication, as well as for onsite system assessment of equipment aging and to make sure that the systems are operating properly over time. It is desirable for such a characterization to be simple and avoid complex manipulations inside the system. One known approach is to position a calibration target, either two dimensional or three dimensional, into the imaging region, and perform a standardized image metric analysis to confirm that a system is working within specifications. However, currently available calibration targets provide limited information. One challenge encountered in developing suitable calibration targets is that fabricating a variable gray level in the millimeter-wave region is not as simple as printing a gray tone level chart on a suitable material. Obtaining various gray levels must be done using alternative methods. Referring to U.S. Pat. No. 10,254,170, it is known in the art to fabricate gray-level targets for millimeter-wave radiation using indium tin oxide sheets having specific sheet resistivities. The coefficient of reflection varies with sheet resistivity, which in turn affects the power of millimeter-wave reflection. Various arrangements of these sheets can be used to build 2D or 3D contrast phantoms for millimeter wavelengths and having areas with different reflection coefficients.

There remains a need for a target device allowing characterization of terahertz imaging systems and that provides at least some improvements over the prior art.

SUMMARY

In accordance with one aspect, there is provided target device for characterizing terahertz imaging systems using terahertz radiation. The target device comprises:
- a terahertz resolution pattern having spatially distributed resolution features;
- at least one prism assembly coupled to the terahertz resolution pattern and configured to provide a variable contrast level within the resolution features when used with the terahertz radiation, each of the at least one prism assembly being arranged in a Frustrated Total Internal Reflection (FTIR) configuration and comprising:
  - a first prism made of a material having a first refractive index $n_1$ for said terahertz radiation, the first prism having outer interfaces, one of the outer interfaces of the first prism defining an input interface of said prism assembly, said input interface being positioned to receive an incident terahertz radiation beam; and
  - a second prism made of a material having a second refractive index $n_2$ for said terahertz radiation, the second prism having outer interfaces,
  wherein the first and second prisms have respective first and second FTIR interfaces $i_1$ and $i_2$ facing each other and separated by a gap having a variable width.

In some implementations, the variable width of the gap is defined by a fixed variation of a distance between the first and second FTIR interfaces. In some variants, the first and second FTIR interfaces are oriented at an angle, the gap thereby having a wedge shape. In other variants, one of the first and second FTIR interfaces has a profile forming a pattern.

In some implementations, the variable width of the gap is defined by an adjustable variation of a distance between the first and second FTIR interfaces. Each of the at least one prism assembly may comprise a gap width adjustment mechanism configured to vary the distance between the first and second FTIR interfaces. The gap width adjustment mechanism may comprise a translation stage for moving one of the first and the second prisms relative to the other.

In some implementations, the target device comprises at least one resolution mask, each of the at least one resolution mask having a frame and a plurality of openings through said frame, the openings of the at least one resolution mask providing the resolution features of the terahertz resolution pattern.

In some implementations, the terahertz resolution pattern comprises a patterned reflective layer deposited on one of the outer interfaces of the first prism or the second prism of the at least one prism assembly.

In some implementations, the terahertz resolution pattern is provided along the input interface of each of the at least one prism assembly, the spatially distributed resolution features allowing the incident terahertz radiation beam to be transmitted therethrough, thus providing a patterned terahertz radiation beam. In some variants, the target device may further comprise a reflector provided across a path of a reflected radiation beam, the reflected radiation beam corresponding to a portion of the patterned terahertz radiation beam reflected by the first FTIR interface. In other variants, the target device may further comprise a reflector provided across a path of a transmitted radiation beam, the transmitted radiation beam corresponding to a portion of the patterned terahertz radiation beam transmitted through the gap by evanescent-wave coupling.

In some implementations, the terahertz resolution pattern is provided along another one of the outer interfaces of the first prism of each of the at least one prism assembly and extends across a path of a reflected radiation beam corresponding to a portion of the incident terahertz radiation beam transmitted through the input interface and then reflected by the first FTIR interface, the spatially distributed resolution features reflecting the reflected radiation beam. In some variants, the outer interface of the first prism on the terahertz resolution pattern is provided has a curvature selected to substantially match a wavefront of the incident radiation beam.

In some implementations, the target device is provided in combination with a field lens positioned in front of the target device and configured to spatially flattens a wavefront of the incident radiation beam.

In some implementations, the terahertz resolution pattern is provided along one of the outer interfaces of the second prism of each of the at least one prism assembly and extends across a path of a transmitted radiation beam corresponding to a portion of the incident terahertz radiation beam transmitted through the input interface and then transmitted through the gap by evanescent-wave coupling, the spatially distributed resolution features reflecting the transmitted radiation beam.

In some implementations, the terahertz resolution pattern is provided along one of the first and second FTIR interfaces $i_1$ and $i_2$ of each of the at least one prism assembly.

In some implementations, the at least one prism assembly consist of a plurality of said prism assemblies, the prism assemblies being spatially distributed such that each of said prism assemblies defines one of the resolution features of the terahertz resolution pattern.

In some implementations, the at least one prism assembly consist of a plurality of said prism assemblies arranged in a bidimensional array.

In some implementations, the at least one prism assembly consist of a plurality of said prism assemblies, the target device comprising a cylindrical holder, the prism assemblies being mounted on an outer surface of said cylindrical holder.

Advantageously, the use of target devices according to some of the embodiments described herein may provide quantitative information relevant to the performance assessment and degradation quantification of terahertz imaging systems.

By acting as a source of different illumination levels, target devices according to some implementations allow for different properties of the system under test to be measured. When using the device without spatial patterns, properties such as the electro-optical transfer function (linearity) or pixel signal-to-noise ratio can be measured. When a pattern is overlaid on the target, properties such as the minimum resolvable contrast (MRC) or the noise equivalent reflectance/transmittance difference (NERD) can be measured.

Other features and advantages will be better understood upon a reading of embodiments thereof with reference to the appended drawings.

BRIEF DESCRIPTION OF THE DRAWINGS

FIGS. 13A to 13C are typical contrast images that can be obtained using a target device such as illustrated in FIG. 13 in which the gap spacing is set as illustrated in FIGS. 13D to 13F, respectively.

FIGS. 14A to 14C are typical contrast images that can be obtained using a target device such as illustrated in FIG. 14 in which the gap spacing is set as illustrated in FIGS. 14D to 14F, respectively;

FIGS. 17A to 17E illustrate the use of a target device including four prism assemblies arranged in a 2×2 array.

FIGS. 20A to 20C are typical contrast images that can be obtained using a target device such as illustrated in FIG. 20 and in which the prism assemblies are disposed as illustrated in FIGS. 20D to 20F, respectively.

FIG. 22A shows images taken with four different gap widths; FIG. 22B is a graph of the experimentally obtained relative gray levels for 15 discrete values of the gap width; and FIG. 22C illustrates the temporal noise standard deviation (std) to the average intensity relation for the data shown in FIG. 22B.

DETAILED DESCRIPTION

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundary of the broader range is also contemplated. For example, if a broad range of 0 to 1000 is provided, any narrower range between 0 and 1000 is also contemplated. If a broad range of 0 to 1 is mentioned, any narrower range between 0 and 1, i.e. with decimal value, is also contemplated.

In accordance with one aspect, there is provided a target device for characterizing terahertz imaging systems.

The terahertz imaging systems which may be characterized using the target devices described herein may be embodied by a variety of systems that generate images of an object using electromagnetic radiation having an optical frequency in the terahertz (i.e., $10^{12}$ Hz) range. Within the context of the present description, the expression "terahertz radiation" is understood to refer to radiation having a wavelength in the millimeter range. The expression "millimeter range" is generally understood to cover wavelengths from about 0.1 mm (3 THz) to about 30 mm (10 GHz, or 0.01 THz), although this definition may vary according to applicable standards and considerations associated with a particular field of application. According to this definition, one skilled in the art will readily understand that radiation having an optical frequency lying in the sub-terahertz range also falls within the broad scope of the expression "terahertz radiation". In other words, the expression "terahertz" is understood to encompass optical frequencies in the sub-terahertz range. In the present description, the expression "millimeter-wave" and "terahertz" may be used interchangeably.

Figure 1:
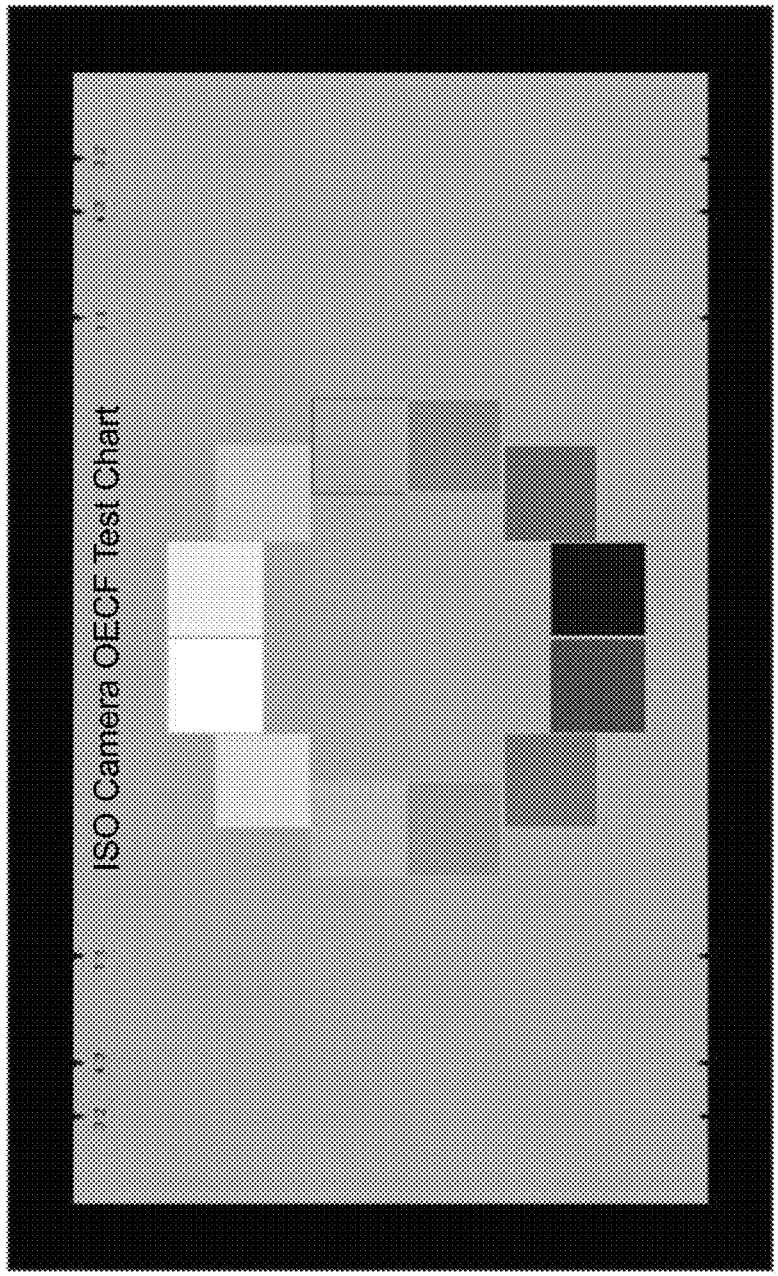
FIG. 1 (PRIOR ART) is a front view of an OECF test chart used in the characterization of imaging devices operating in the visible spectral region.
Figure 2A:
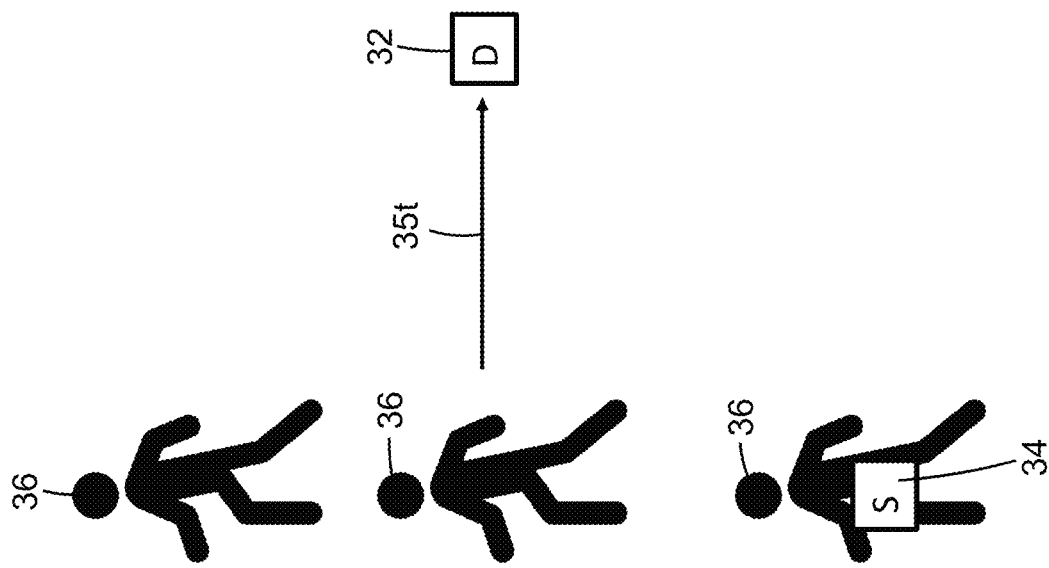
FIGS. 2A to 2C illustrate various configurations of terahertz imaging systems for obtaining images of an object.
Figure 2B:
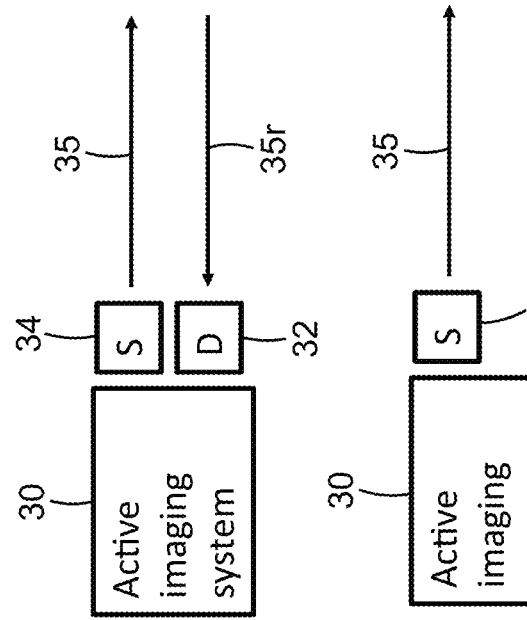
Figure 2C:
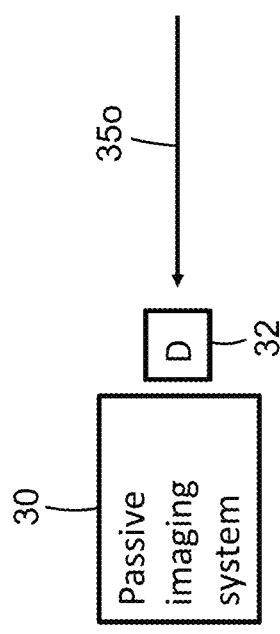

Referring to FIGS. 2A to 2C, various configurations of terahertz imaging systems 30 for obtaining images of an object 36 are shown. In these figures, the object 36 is schematically represented as a human subject, but it will be readily understood that the terahertz imaging systems may be used to image other types of objects or scenes, such as for example mail envelopes or boxes containing components, objects buried in soil, pharmaceutical containers or any manufactured object having internal components (desired or undesired) or through-wall imaging, and the like.

The terahertz imaging system 30 generally includes a detector 32 and a terahertz radiation source 34. The detector 32 may be embodied by any camera or sensor arrangement known in the art of millimeter-wave imaging such as Schottky diode, cooled and uncooled microbolometer, pyroelectric, piezoelectric, field effect transistor and others, either in single element or in array.

In the configurations of FIGS. 2A and 2B, the millimeter-wave imaging system 30 is an active-type system, that is, the radiation source 34 provides artificial and controlled illumination of the object 36. The radiation source 34 in these configurations may be embodied by any device or arrangement of devices suitable to generate an imaging radiation field 35 having a wavelength in the millimeter-wavelength range, for example from about 0.1 mm (3 THz) to about 30 mm (10 GHz). In FIG. 2A, the terahertz imaging system 30 is used in reflection mode, that is, the imaging radiation field 35 radiated from the radiation source 34 is projected on the object 36 and a reflected portion 35r is detected by the detector 32, positioned near the radiation source 34. In such configurations, objects or portions of objects 36 having a high reflectivity will provide a significant amount of radiation for detection, while absorbing materials will not. FIG. 2B shows a configuration operating in transmission mode, wherein the imaging radiation field 35 radiated from the radiation source 34 illuminates the object 36, and a transmitted portion 35t thereof is collected after transmission through the object 36. In such an arrangement, high reflectivity materials will reflect a significant amount of radiation, thus preventing transmission, while absorbing materials will transmit radiation with reduced power. Finally, FIG. 2C shows a passive configuration where the radiation source 34 is the object 36 itself. For example, the human body emits radiation as a black body at a temperature of about 310 K, and a concealed object between human skin and the imaging system will show as a contrast in the amount of radiation captured by detector 32. In such a configuration, the imaging system may exclude a terahertz source of radiation, and the detector receives an object radiation field 35o radiated directly from the object 36. It will be readily understood by one skilled in the art that reference in the present description to terahertz imaging systems using terahertz radiation encompass both active and passive systems.

As is known in the art, the imaging system 30 may include imaging optics (not shown) for either or both shaping the imaging radiation field radiated from the radiation source 34 or collecting radiation 35r, 35t or 35o from the object 36 prior to detection. The imaging optics may include objectives, lenses, mirrors, filters, or any other suitable optical components. At least some of the imaging optics may involve movable parts and scanning systems, such as, for example, a scanning of a single point source or array. Other imaging approaches may make use of a synthetic aperture imaging technique such as using single or phased array of elements spatially distributed in one or two dimensions.

Figure 3A:
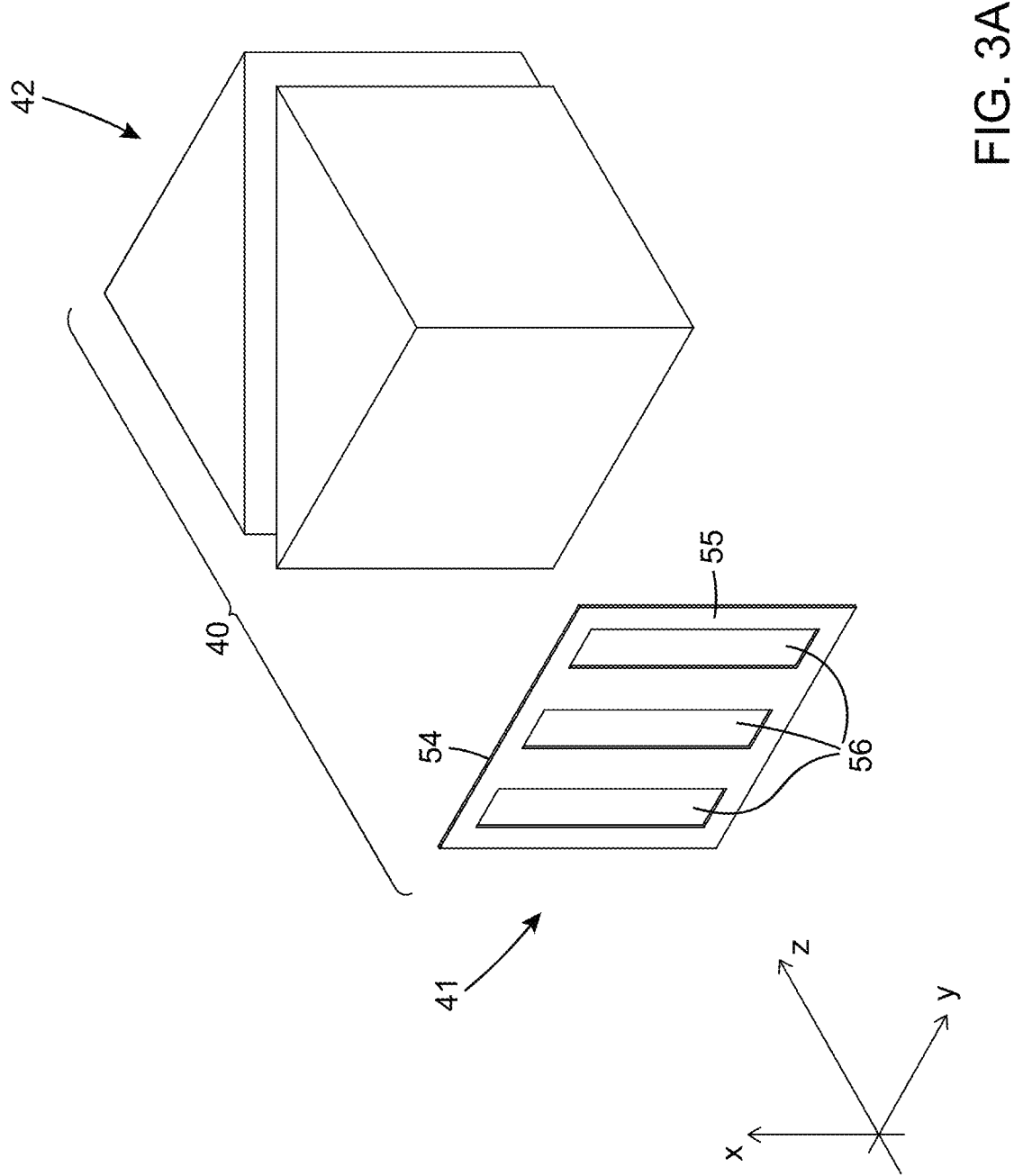
FIGS. 3A, 3B and 3C are exploded views of a target device according to some embodiments, using terahertz resolution patterns with different shapes.
Figure 3B:
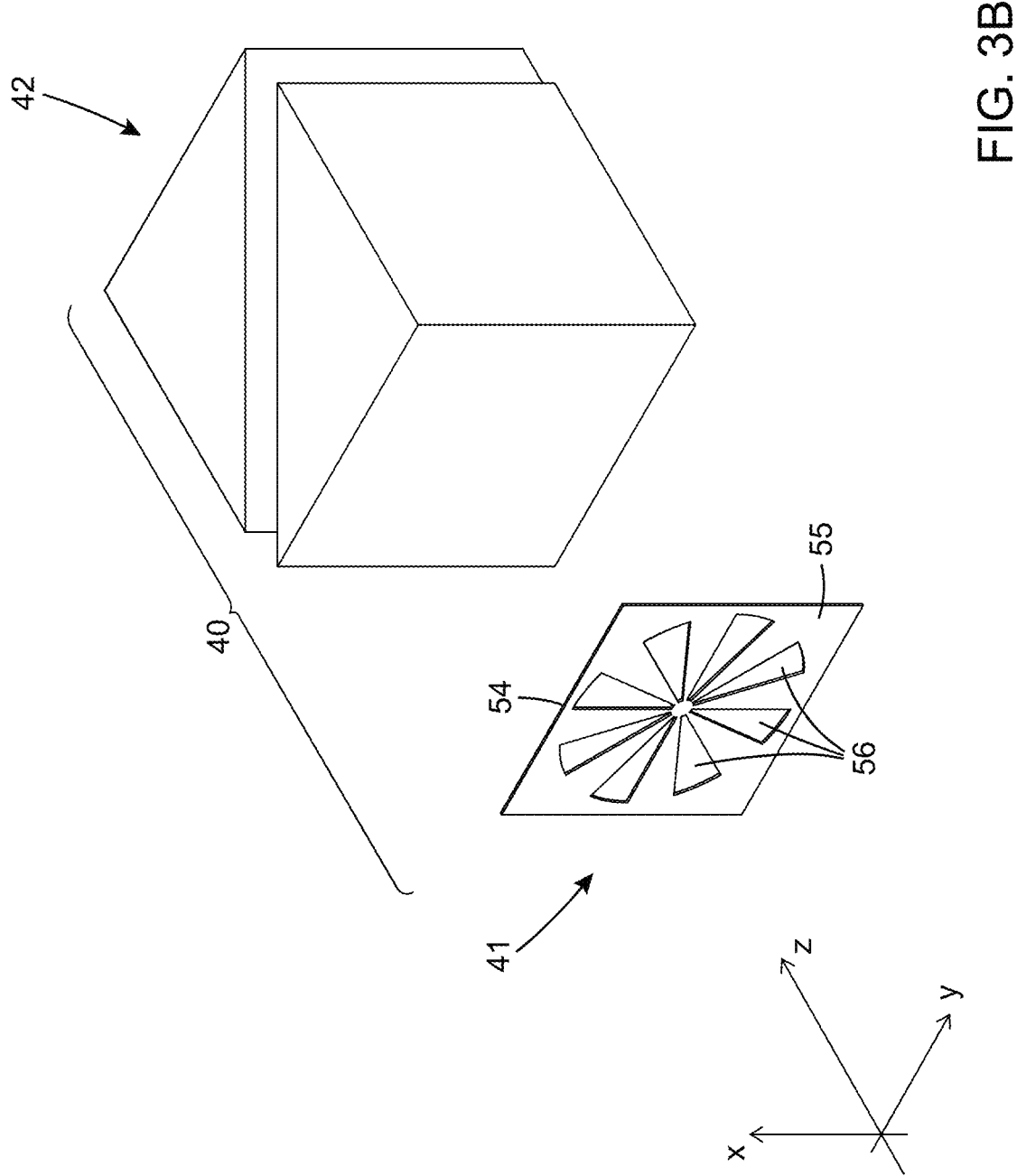
Figure 3C:
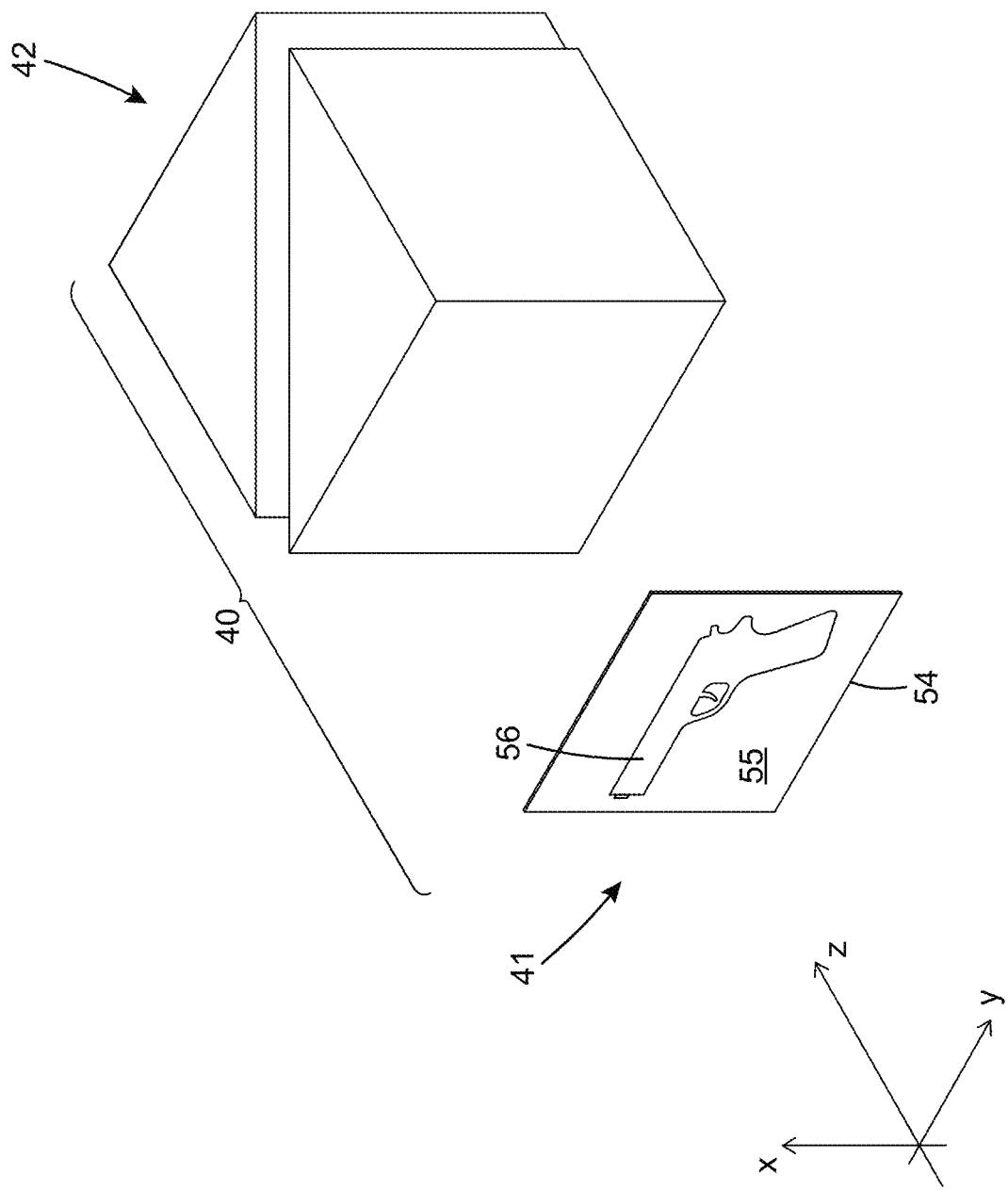

Referring to FIGS. 3A, 3B and 3C, there is shown an exploded view of a target device 40 according to some implementations. The target device generally includes a terahertz resolution pattern 41 as defined below, and at least one prism assembly 42 coupled to the terahertz resolution pattern.

Target devices described herein may be used to assess the performance of terahertz imaging systems such as described above. In accordance with one aspect, embodiments of such target devices combine tunable contrast level millimeter-wave targets with resolution features. As explained in further details below, the target devices may be used to measure and/or evaluate one or more properties of the terahertz imaging system such as the electro-optical transfer function (linearity), pixel signal-to-noise ratio, minimum resolvable contrast (MRC) and the noise equivalent reflectance/transmittance difference (NERD).

In some implementations, the prism assembly 42 has a configuration based on the electromagnetic tunnel effect. This effect is also sometimes referred to in the art as Frustrated Total Internal Reflection (FTIR), or optical tunneling.

Figure 4C:
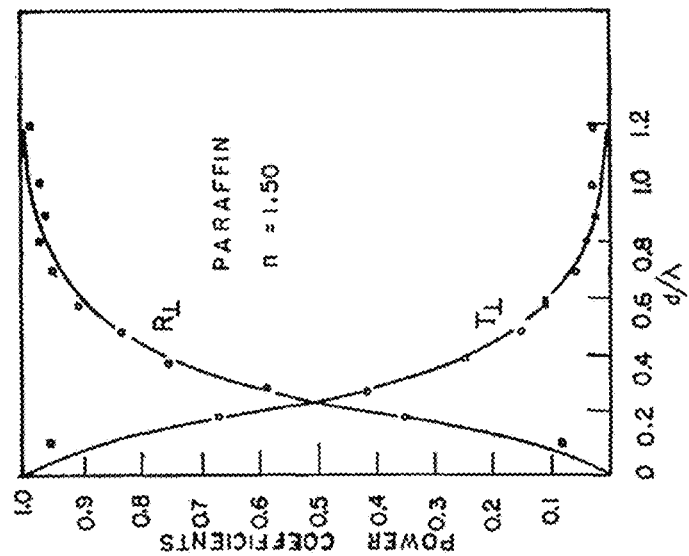
FIGS. 4A to 4C (PRIOR ART) illustrate the generic FTIR phenomenon (FIG. 4A) and the power coefficients of reflection (R) and transmission (T) for both parallel (FIG. 4B) and perpendicular (FIG. 4C) polarization states of an incident radiation beam.
Figure 4B:
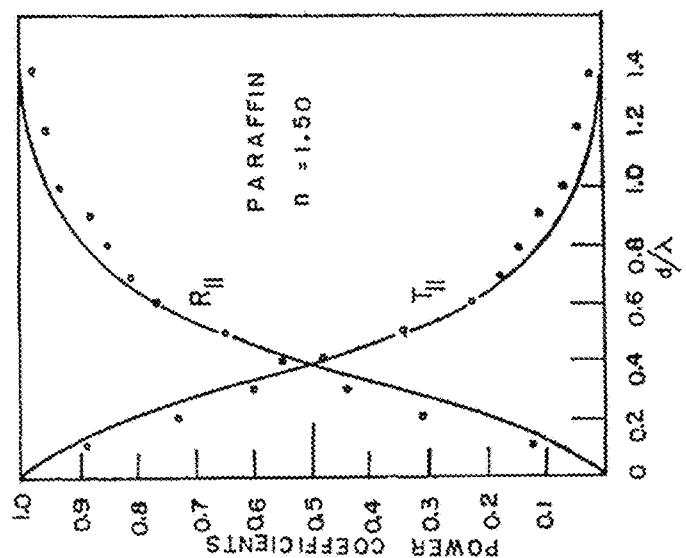
Figure 4A:
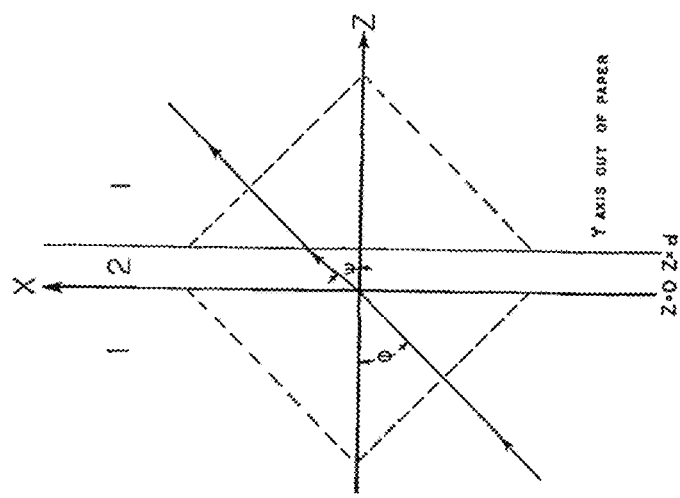

The theory of the electromagnetic tunnel effect was developed by E. E. Hall in 1902. Additional background information on this topic may be found in J. J. Brady et al, J. Opt. Soc. Am. 50, 1080-1084 (1960), the entire contents of which is incorporated herein by reference. FIG. 4A to 4C, from this reference, illustrate the generic FTIR phenomenon and the power coefficient of reflection (R) and transmission (T) for both parallel ($\parallel$) and perpendicular ($\perp$) polarization states of an incident radiation beam.

Figure 5:
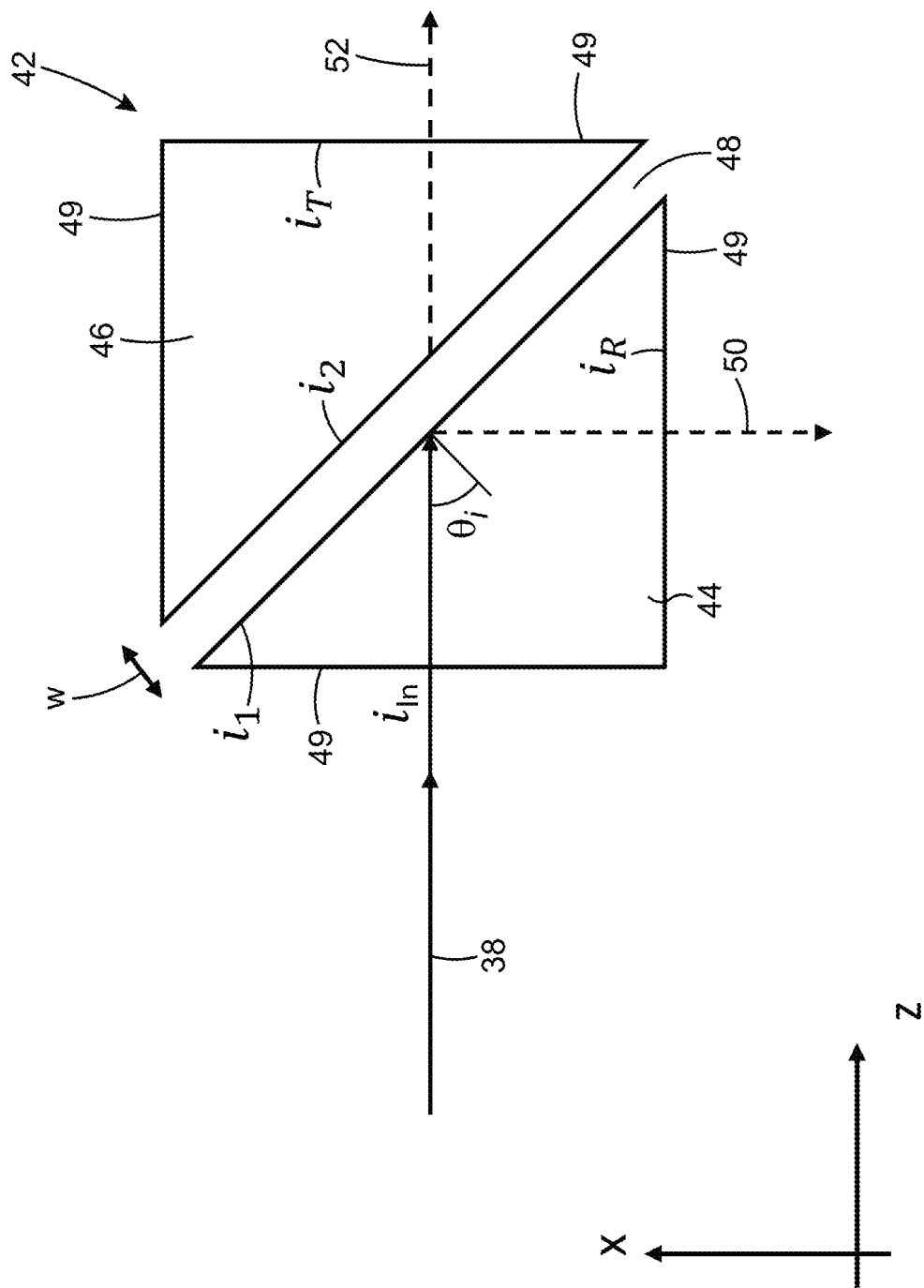
FIG. 5 is a top view of a prism assembly according to one aspect.

An example of a prism assembly 42 is shown in FIG. 5. In accordance with one aspect the prism assembly 42 is arranged in an FTIR configuration and includes a first and a second prism 44 and 46. Both prisms 44 and 46 are made of dielectric materials having respective first and second refractive indices $n_1$ and $n_2$ for terahertz radiation. In some implementations, both prisms 44, 46 are made of the same dielectric material and therefore have a same refractive index ($n_1=n_2$). In other variants, the first and second prisms 44 and 46 may be made of different materials having different refractive indices ($n_1 \neq n_2$). The refractive index of each of the prisms is higher than that of the surrounding environment, typically air, which has a refractive index of about 1. Various materials may be considered for each of the first and second prisms 44 and 46. In some implementations one or both prisms may be made of a plastic material, such as high-density polyethylene (HDPE), which has a refractive index around 1.53 with almost no dispersion, meaning that this value is constant with wavelength. Other polymers such as TPX (polymethylpentene), polyethylene (PE), polypropylene (PP), and polytetrafluoroethylene (PTFE or Teflon), Tsurupica, Zeonex, or inorganic materials such as quartz, sapphire may be used. In some implementations, one or both prisms 44 and 46 may be made of high purity and high resistivity silicon, which has a refractive index around 3.4.

The first and second prisms 44 and 46 have respective first and second FTIR interfaces $i_1$ and $i_2$ facing each other and separated by a gap 48 of width w. All other surfaces of the prisms 44 and 46 can be defined as outer interfaces 49. In the illustrated embodiment, both prisms 44 and 46 have a triangular shape with a rectangular base surface defining the corresponding FTIR interface $i_1$ and $i_2$, although other shapes may be considered. The first and second prisms 44 and 46 are disposed sufficiently close to each other such that Frustrated Total Internal Reflection can occur at the FTIR interfaces $i_1$ and $i_2$, as explained below.

In use, an incident radiation beam 38 propagates along an initial radiation propagation direction, shown from left to right along the z axis in the illustrated frame of reference. The incident radiation beam 38 impinges on the first prism 44 at normal incidence on one of the outer interfaces of the first prism 44. By convention, the one of the two prisms of the prism assembly 42 initially encountered by the incident radiation beam 38 is the first prism 44, and the one of the outer interfaces 49 of the first prism 44 positioned to receive the incident radiation beam 38 defines an input interface $i_{in}$ of the prism assembly 42. The incident radiation beam 38 travels across the input interface $i_{in}$ between the first prism 44 and the surrounding environment without any significant losses. Upon reaching the first FTIR interface $i_1$ separating the first prism 44 and the gap 48, the incident radiation beam 38 experiences total internal reflection if its incidence angle $\theta_i$ on the interface $i_1$ is equal to or greater than a critical angle defined by:

$$\theta_c = \arcsin\left(\frac{n_{air}}{n_1}\right) \quad (1)$$

When this condition is met, the incident radiation beam 38 undergoes specular reflection at the first FTIR interface $i_1$, continues travelling within the first prism 44 as a reflected radiation beam 50 and eventually exits from another one of the outer interfaces 49 of the first prism 44, which defines a reflected output interface $i_R$. However, a small portion of the energy of the incident radiation beam 38, called an evanescent wave, can penetrate beyond the first FTIR interface $i_1$ and into the gap 48. If the second prism 46 is sufficiently close to the first prism 44, a portion of the evanescent wave energy can be coupled into the second prism 46 through the second FTIR interface $i_2$, and radiation will continue its propagation along the z axis as a transmitted radiation beam 52. The transmitted radiation beam 52 exits the second prism 46 through one of its outer interfaces 49, defining a transmitted output interface $i_T$, along a transmitted path.

The proportion of the optical power of the incident radiation beam 38 escaping from the first prism 44 at the first FTIR interface $i_1$ through evanescent waves varies according to the width w of the gap 48. The width w of the gap 48 is typically of the same order of magnitude as the wavelength of the incident radiation beam 38. Far beyond such a distance no energy is transferred to the transmitted path, whereas if the two prisms 44 and 46 are so close that the width w of the gap 48 is almost zero, the FTIR interfaces $i_1$ and $i_2$ do not act as reflectors, and no frustrated total internal reflection occurs. By changing the spacing between the FTIR interfaces $i_1$ and $i_2$, the proportion of optical power in the transmitted and reflected radiation beams 50 and 52 can be therefore be varied.

In accordance with one aspect, the gap 48 separating the first and second prisms 44 and 46 of each prism assembly has a variable width w.

Figure 6:
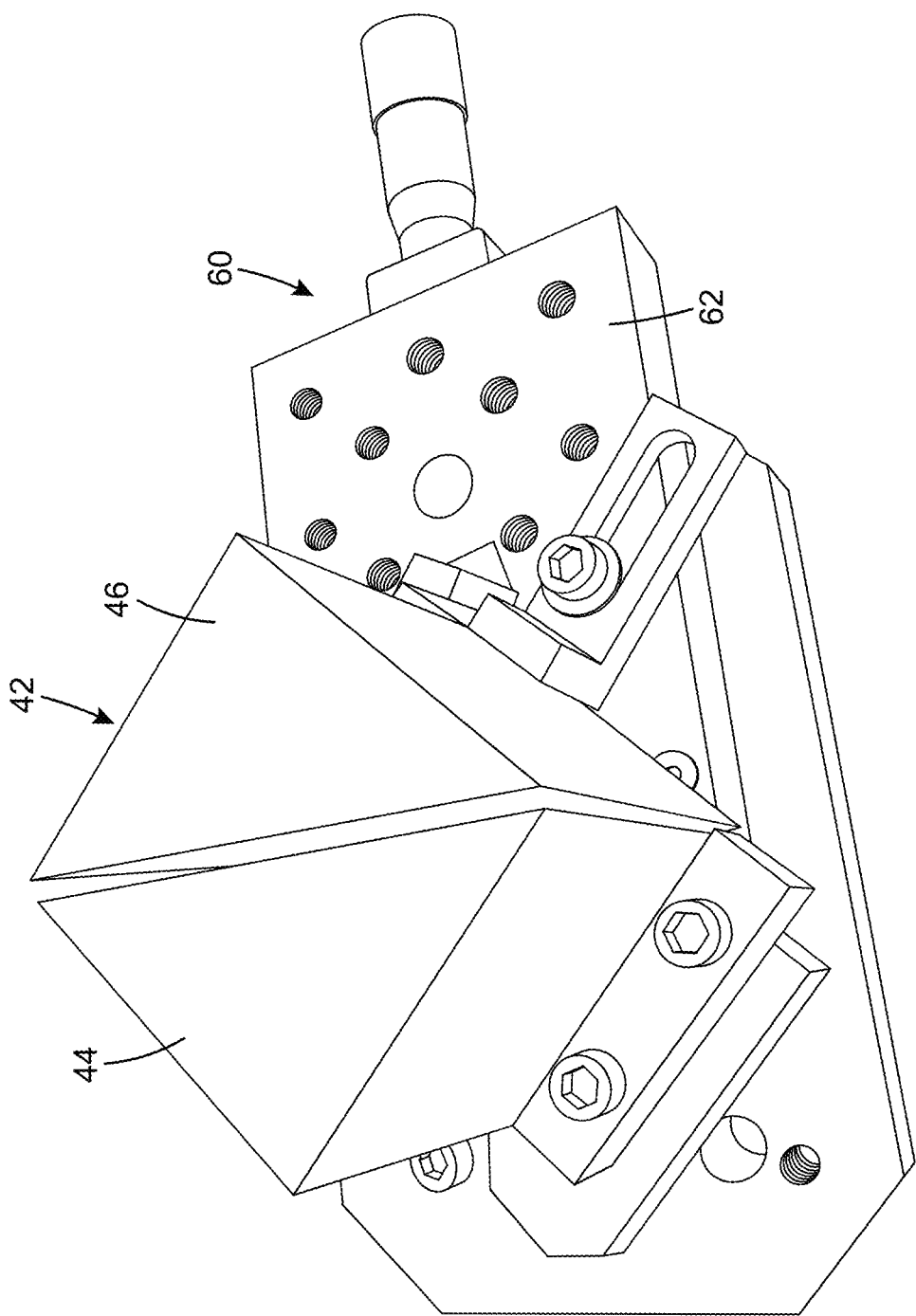
FIG. 6 is a perspective view of a prism assembly according to one embodiment.

In some implementations, the variable width w of the gap is defined by an adjustable variation of the distance between the first and second FTIR interfaces $i_1$ and $i_2$. In preferred embodiments, the prism assembly 42 may include a gap width adjustment mechanism 60 configured to vary the distance between the first and second FTIR interfaces $i_1$ and $i_2$. Referring to FIG. 6 The gap width adjustment mechanism 60 may for example include a translation stage 62 displacing the first prism 44 or the second prism 46 with respect to the other, which may for example be mounted on a fixed reference such as an optical table. Translation stages or the like with sufficient precision to move optical components over ranges in the order of millimeters or less are readily available. In other variants, various types of transducers such as piezoelectric, motorized and voice coil actuators can be placed at various location on the first or the second prism interfaces, as long as they do not obscure the target imaging portion. Their axis of displacement may be at an arbitrary position within the reference frame as the width w of the gap variation can be calculated or calibrated for a given translation mechanism.

Preferably, the surfaces of the first and second prisms 44 and 46 defining the first and second FTIR interfaces $i_1$ and $i_2$ are preferably polished to a surface finish of suitable quality for allowing approaching the two surfaces at the required distance and providing a smooth interface, preferably with a roughness smaller than the wavelength of the incident radiation beam. The gap width adjustment mechanism 60 preferably provides a control of the parallelism between both surfaces which are designed accordingly.

Figure 7C:
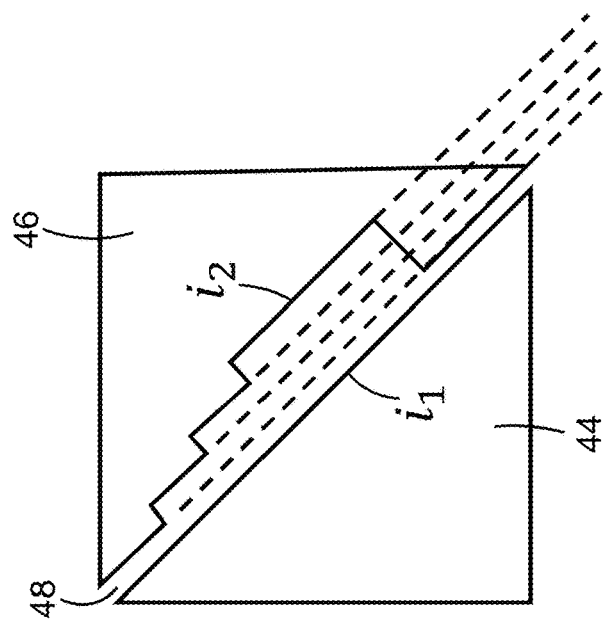
FIGS. 7A to 7E show different configurations of gaps having variable widths defined by a fixed variation of the distance between the first and second FTIR interfaces.
Figure 7B:
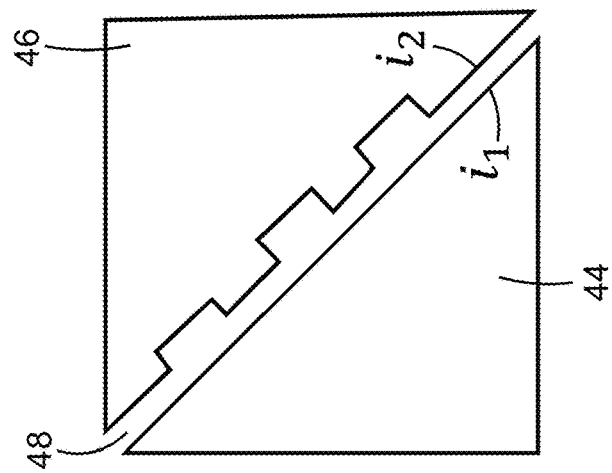
Figure 7A:
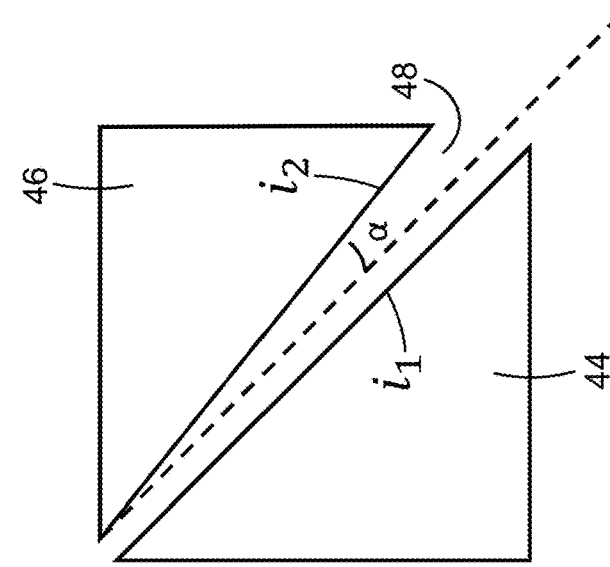
Figure 7E:
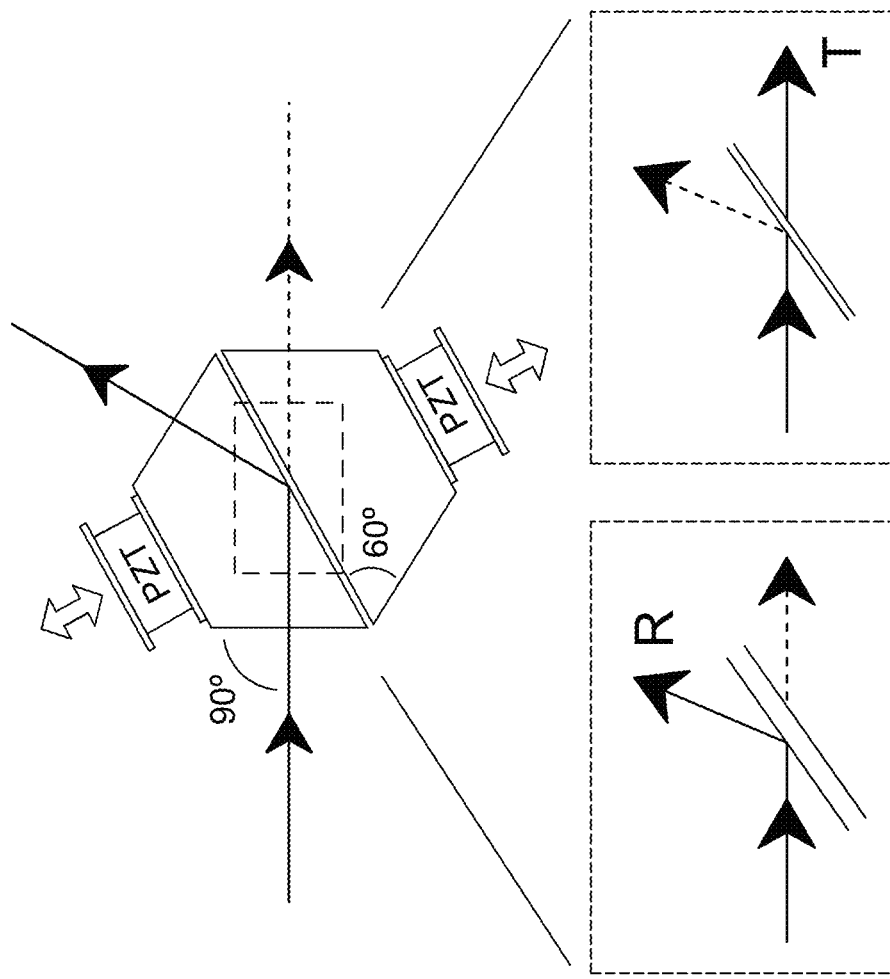
Figure 7D:
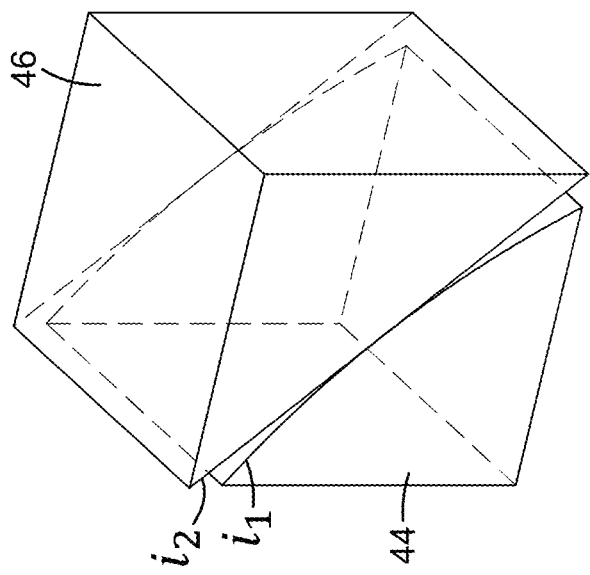

In some implementations, the variable width of the gap 48 is defined by a fixed variation of the distance between the first and second FTIR interfaces $i_1$ and $i_2$. In such embodiments, the relative alignment between the first prism 44 and the incident radiation beam 38 depends on the location of the evanescent wave transfer through the gap 48, and therefore the width w of the gap 48 involved in the FTIR process. It is of interest to note that in this variant, the gap width varies spatially, as opposed to a varying in time as the relative distance between the two prisms is changed. Referring to FIG. 7A, in one example, the first and second FTIR interfaces $i_1$ and $i_2$ are oriented nonparallel to each other, the gap 48 thereby having a wedge shape set by a wedge angle α. In other implementations, the first of the second FTIR interface $i_1$ or $i_2$ may have a profile forming a pattern. By way of example, FIG. 7B shows a variant wherein the second FTIR interface $i_2$ of the second prism 46 has a shape that mimics a three-bar pattern resolution target. The resulting gap size varies periodically and can therefore provide bars of gray level contrast. This periodic gap can be engineered to get the shape of a sine wave, with smoother transitions. Instead of a periodic variation, an object shape contour may alternatively be patterned on one of the interfaces, such as for example the handgun shape shown in FIG. 3C. A similar approach can be used to provide a gap width w varying in a staircase fashion, as shown in FIG. 7C. These latter embodiments provide varying gray levels along the diagonal of the prism arrangement. In yet another example, the FTIR interface of one of the first and second prisms 44 and 46 may have has a cylindrically curved profile, such as shown in FIG. 7D (from Hetch E. Optics, (Addison-Wesley, San Francisco, CA, 2001), 4th ed. p. 127). FIG. 7E (from David C. S. et al, Appl. Opt. 42, 6006-6015 (2003)) illustrates the use of dove-shaped prisms which can be displaced using piezoelectric actuators. These examples of configurations highlight the fact that various prism geometries ca be envisioned to perform variable FTIR, all of them using the principle of a varying gap between two dielectric interfaces illuminated at an incidence angle set equal to or greater than the critical angle. Numerous additional configurations could be devised without departing from the scope of protection. The gap may be maintained at a fixed width either by being machined within a bulk block or being assembled after machining, i.e. glued abutted with or without addition of spacers of precise dimensions. This way various fixed gap devices having known properties by nominal design can be fabricated.

As mentioned above, the prism assembly 42 provides a variable contrast level for terahertz radiation incident thereon, this variable contrast level being provided in conjunction with the resolution features of the terahertz resolution pattern.

Referring back to FIGS. 3A to 3C, in accordance with some implementations, the target device 40 may include at least one resolution mask 54, providing the resolution pattern 41. Each resolution mask 54 has a frame 55 and a plurality of openings 56 through this frame 55. The openings 56 provide the resolution features of the terahertz resolution pattern. The resolution mask 54 may be provided along one of the outer interfaces of the first or second prism of the prism assembly, contiguous to or spaced apart from the associated interface, and provides an overlaid spatial pattern on the prism assembly 42. The combination thereby provides a resolution target with a tunable contrast level, enabling tunable spectral SNR measurements such as the ones involved in the NERD metric.

The spatially distributed openings 56 may have various shapes, such as for example bar charts with precise spatial frequencies, Siemens or sector star targets, concentric circles, cross hair grid targets and the like. In the examples of FIGS. 3A to 3C, the illustrated target devices 40 show three examples of resolution masks 54 as explained above, each having spatially distributed openings 56 with different shapes. In the example of FIG. 3A, the spatially distributed openings 56 form three opening bars. In FIG. 3B, the spatially distributed openings 56 form a Siemens star. In FIG. 3C, the spatially distributed openings 56 define a pattern representing a typical concealed object to detect, for example a handgun. Any other spatial geometry can be used to mimic an object of interest. In another example, a triangle orientation discrimination is an alternative to perform minimum resolvable contrast, i.e. an observer is presented with imagery of an equilateral triangle over a uniform background, and instructed to identify the orientation of the triangle. The possible orientations of the triangle are: up, right, left, or down. Other shape or method can be used for the evaluation of electro-optical systems. Advantageously, target devices according to some implementations may include a plurality of interchangeable resolution masks enabling additional measurements using a same prism assembly.

In some implementations, the frame 55 of the resolution mask 54 either reflects or absorb radiation incident thereon. In reflective variants, the frame 55 can be made of a metallic material such as for example aluminium sheet or any other metal or material with conductive metallic paint or thin metallic film. In absorbing variants, the frame 55 may for example be made of a thin absorber foam containing carbon load of low electric conductivity. The resolution mask may be in direct contact with the associated interface of the prism or may be spaced therefrom.

Figure 8:
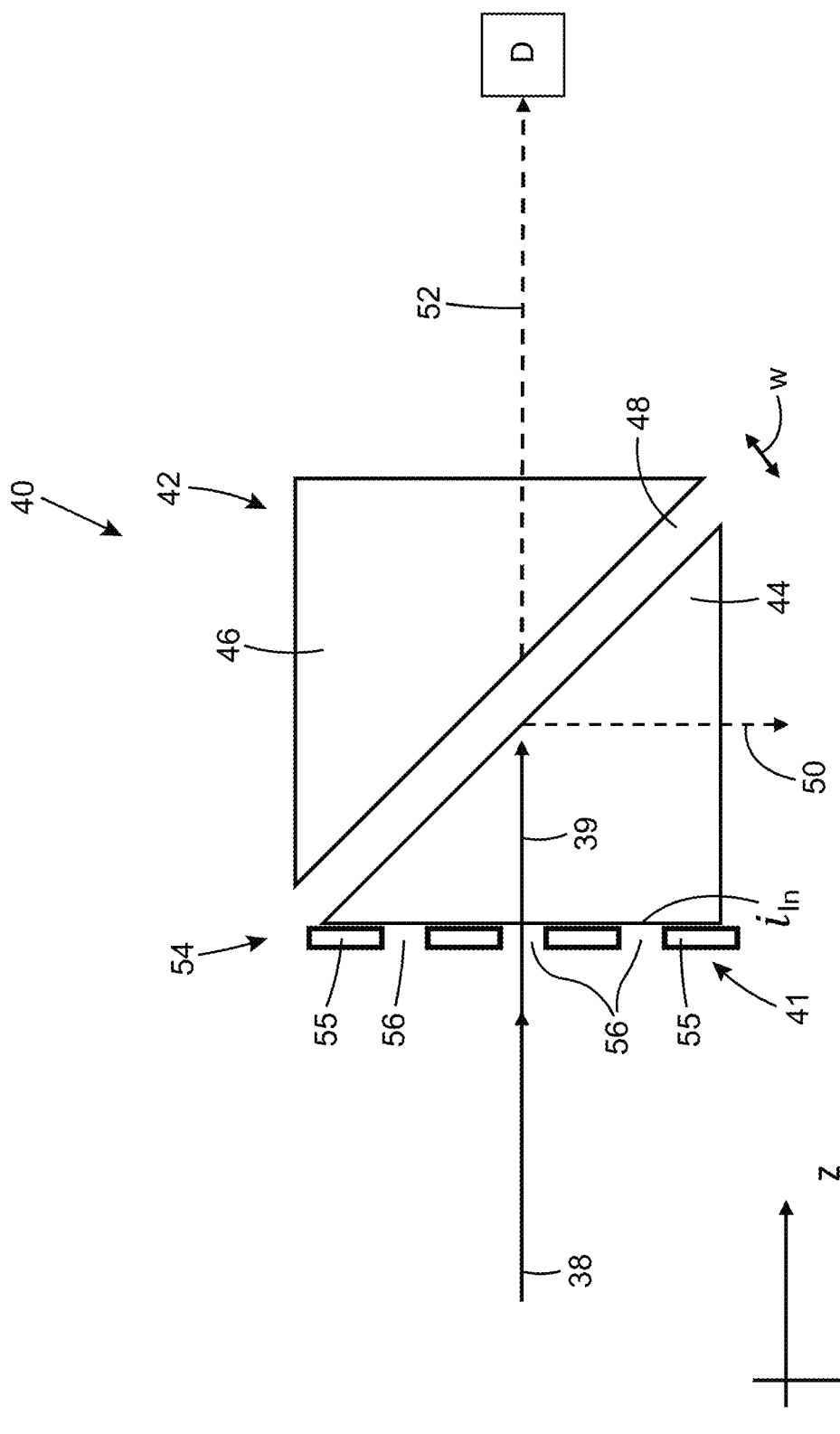
FIG. 8 is a schematized top view of a target device configured for use in transmission to characterize an active imaging system.

In some implementations (see for example FIG. 10A) the terahertz resolution pattern 41 may be embodied by a patterned reflective layer 57 deposited on one of the outer interfaces 49 of the first prism 44 or the second prism 46. In order to get reflection millimeter-wave radiation, a metallic paint (having metal flakes) is a good example with a reasonable coefficient of reflection. A patterned evaporation thin film metal layer can also be used or any reflective materials. Alternatively, absorbers can also be used to form the radiation blocking frame of the resolution mask. For example, anti-static foam being partially conductive and having pore size similar to the wavelength of the incident radiation provides absorption and scattering, and it can therefore acts as a poor reflector for imaging systems. In this case, the contrast will be negative with respect to embodiments with a reflective frame. Referring to FIG. 8, the use of a target device 40 according to one variant, corresponding to a top view of the target device 40 such as shown in the FIG. 3A is illustrated. In this example, the terahertz resolution pattern 41 is embodied by a resolution mask 54 provided along the input interface $i_{in}$ of the prism assembly 42, and forming three bar-shaped openings 56. In the illustrated configuration, the resolution mask 54 is shown contiguous to the input interface $i_{in}$ of the first prism 44 although it will be readily understood that in other variants the resolution mask may be spaced from the first prism 44. The openings 56 embodying the distributed resolution features allow the terahertz radiation therethrough. Therefore, in such variants, a terahertz incident radiation beam 38 travelling towards the target device in the z direction will be partially reflected or absorbed by the frame 55 of the resolution mask 54, and partially passing through the openings 56 and continuing its path through inside the prism assembly 42. Only the spatially distributed resolution features allow the incident terahertz radiation beam to be transmitted therethrough, and thus a patterned terahertz radiation beam 39 is provided.

When used to characterize an active imaging system working in transmission mode, such as schematically shown in FIG. 8, the frame 55 of the resolution mask 54 blocks the portions of the incident radiation beam 38 incident thereon, whereas the portions of the incident radiation beam aligned with the spatially distributed openings 56 defining the patterned terahertz radiation beam 39 will enter the prism assembly 42 and lead to a transmitted radiation beam 52 through evanescent wave propagation in the gap 48, as explained above. By changing the width w of the gap 48 of the prism assembly, the intensity of the transmitted radiation beam 52 can be adjusted, thus providing a mechanism equivalent to the "gray level" variation of printed targets for calibrating visible imaging systems. The reflected radiation beam 50 is directed away from the line of sight of the detection. It can be directed in free space to a farther point so as not to interfere with the operation of the target device or toward an absorber or a beam dump as well known to those skilled in the art.

Figure 9:
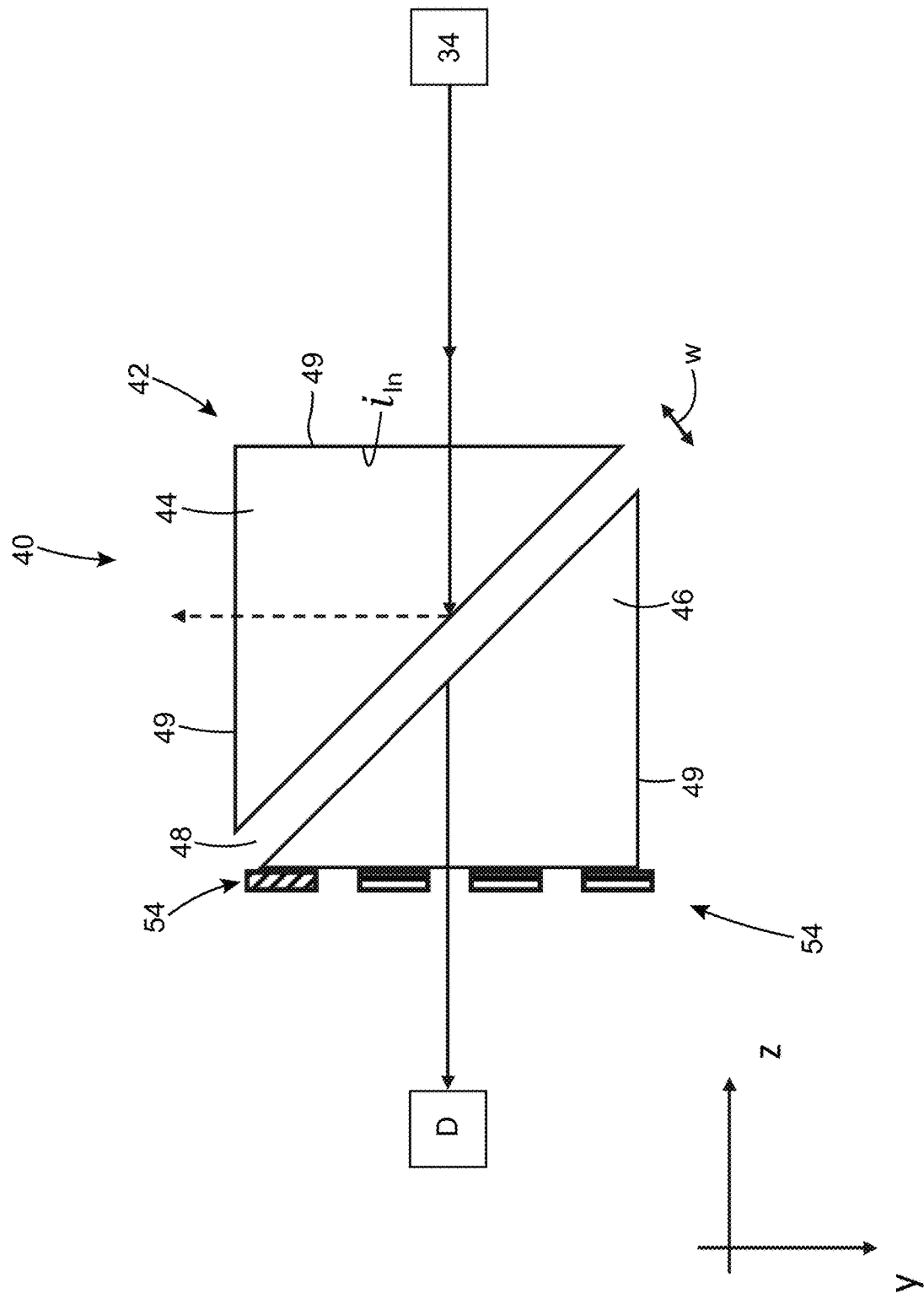
FIG. 9 is a schematized top view of a target device configured for use in transmission to characterize a passive imaging system.

Referring to FIG. 9, a configuration using the target device 40 in transmission for characterizing a passive imaging system is shown. Radiation from an object being imaged, acting as the radiation source 34, travels in the −z direction in the reference system of FIG. 9. Optionally, illumination may be shone toward the −y direction according to the system needs or configuration constraints for placement of the target device within the imaging system under characterization. In this case, the prism furthest from the imaging system defines the first prism 44 by convention, and one of its outer interfaces 49 forms the input interface $i_{in}$.

Figure 10A:
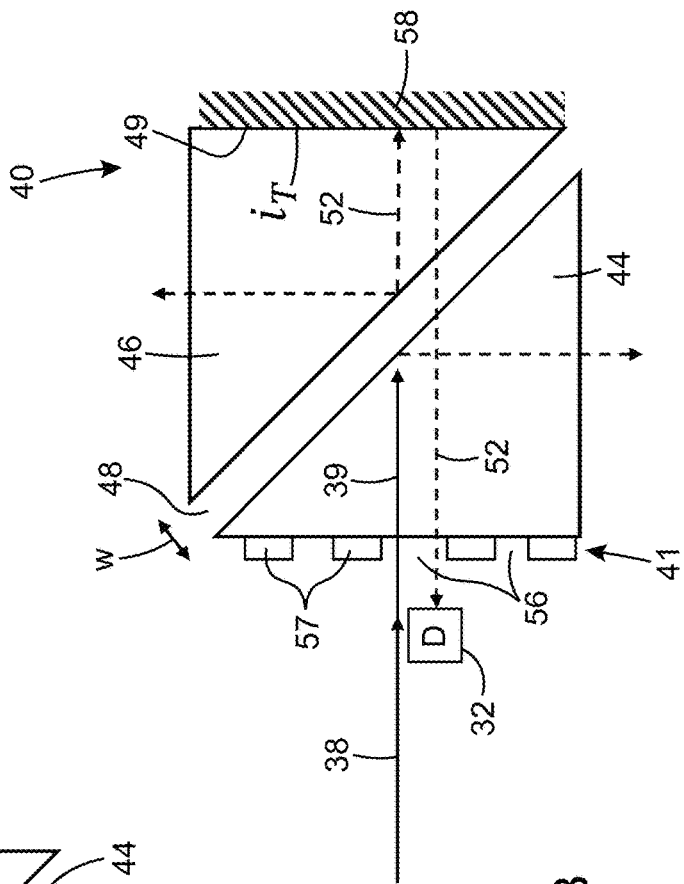
FIGS. 10A to 10C are schematized top views of target devices configured for use in reflection and including reflectors disposed in various positions.
Figure 10B:
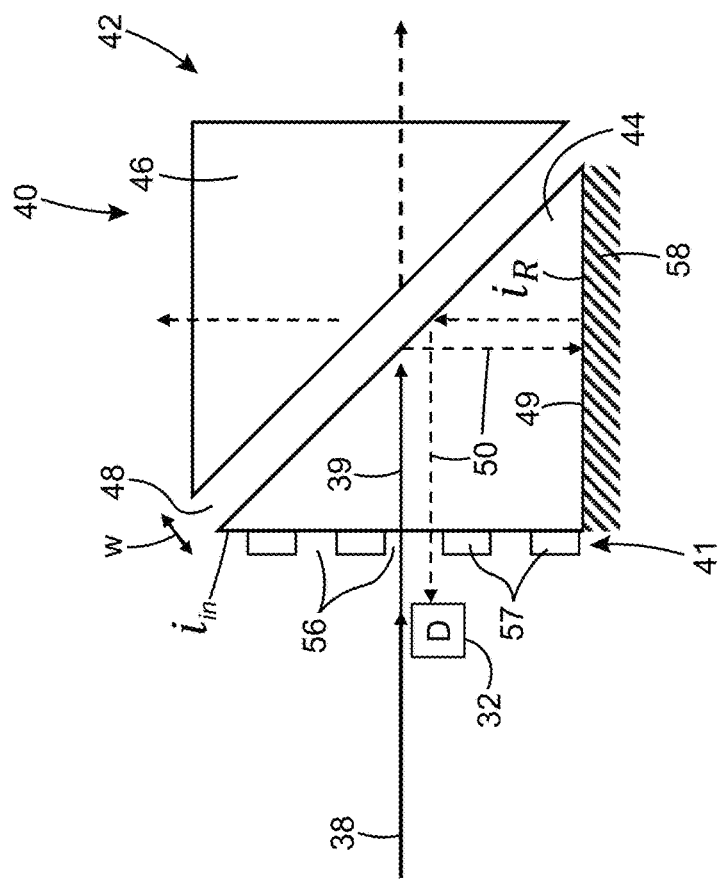
Figure 10C:
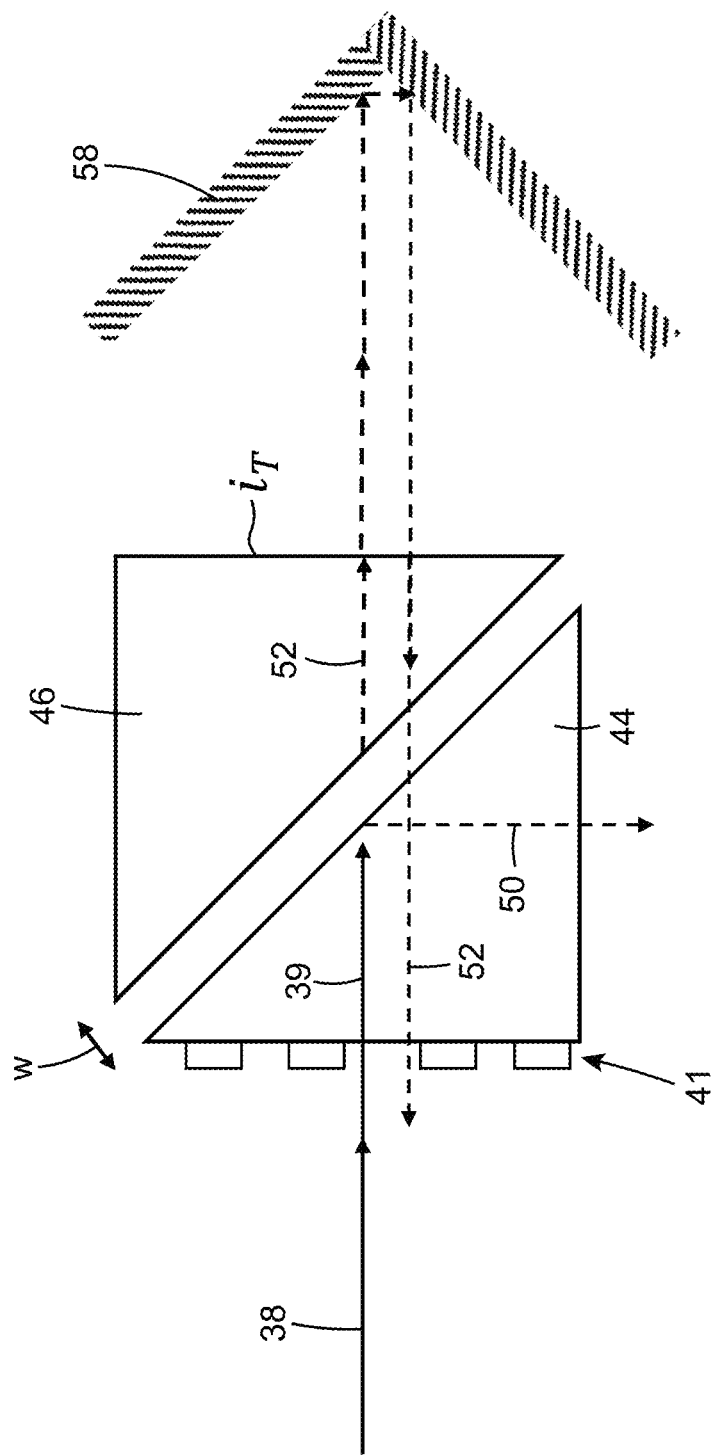

Referring to FIGS. 10A to 10C, there are show several variants of target devices for use in characterizing an imaging system working in reflection mode. In some implementations, the target device 40 may further include a reflector 58 provided across a path of the reflected radiation beam 50, which corresponds to a portion of the patterned terahertz radiation beam 39 reflected by the first FTIR interface $i_1$. An example of such a configuration is shown in FIG. 10A. In this example, the reflector 58 extends along an outer surface 49 of the first prism 44 defining the interface $i_R$. The reflector 58 returns the reflected radiation beam 50 back towards first FTIR interface $i_1$, where it again undergoes total internal reflection and exits the prism assembly 42 through the input interface $i_{in}$, and travels through the openings 56 of the resolution pattern 41 to the detector 32. In this variant, the intensity of the detected radiation is varied according to losses suffered in the total internal reflection process through evanescent waves at both instances. In other variants, as or example shown in FIG. 10B, the reflector 58 may be provided across a path of the transmitted radiation beam 52, that is, the portion of the patterned terahertz radiation beam 39 transmitted through the gap 48 by evanescent-wave coupling. In the variant of FIG. 10B, the reflector 58 is positioned on an outer interface 49 of the second prism 46 defining an interface $i_T$, such that the transmitted beam 52 is returned back through the gap 48 towards the first prism 44 and detected by the detector 32. In either embodiment of FIGS. 10A and 10B, the reflector 58 may be embodied by a mirror positioned contiguously to the surface defining the outer interface $i_R$ or $i_T$, or by a reflective layer deposited directly on this surface. FIG. 10C illustrates another embodiment similar to the variant of FIG. 10B, where the reflector 58 is embodied by a corner-shaped retroreflector positioned in the path of the transmitted radiation beam 52 downstream the interface $i_T$ of the second prism 46. Other retroreflector shapes may be used. In another variant (not shown), a corner shaped reflector may be placed in the path of the reflected radiation beam 50 downstream the interface $i_R$ of the first prism 44.

Figure 11A:
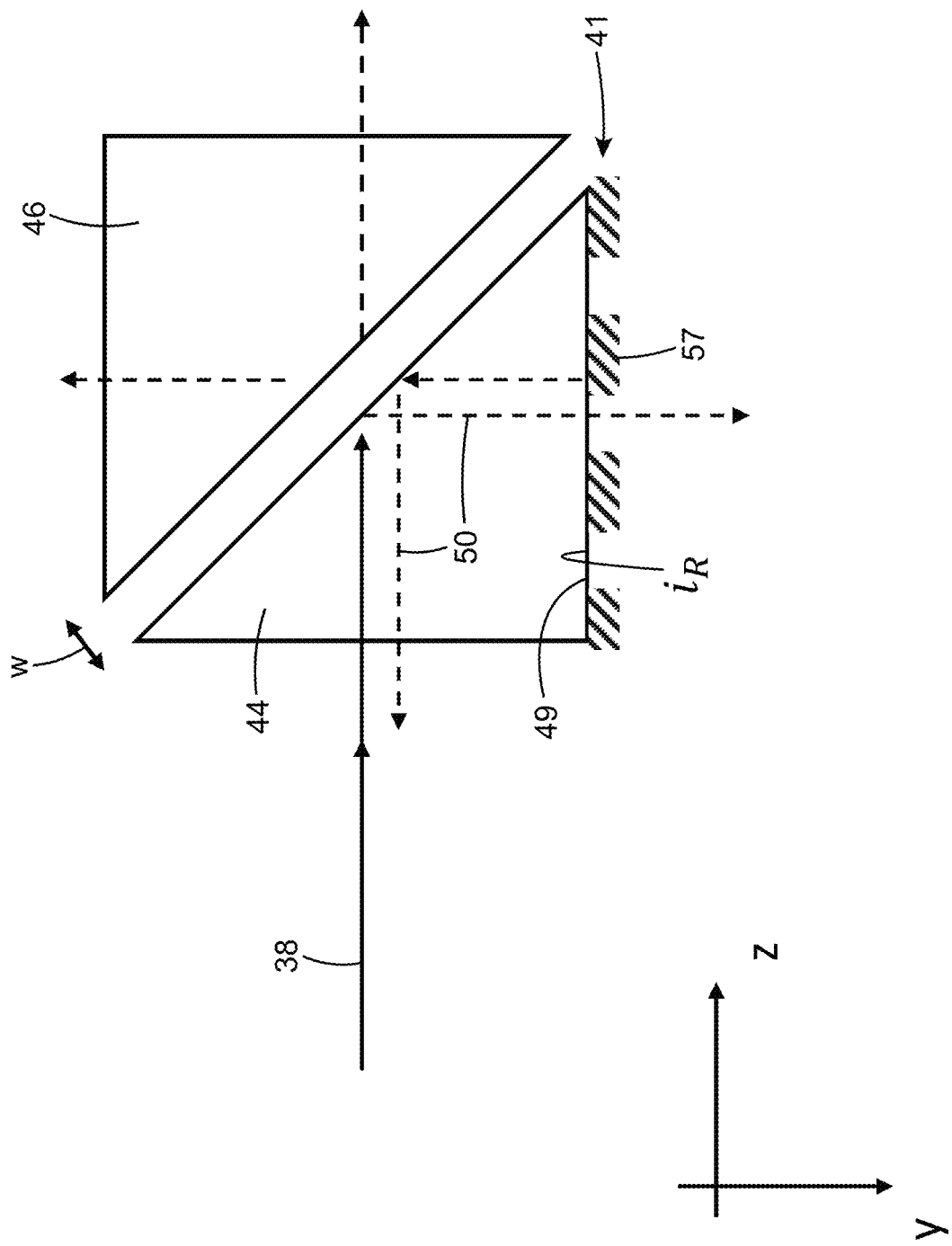
FIGS. 11A to 11C are schematized top views of target devices configured for use in reflection, including reflectors disposed in various positions and acting as the terahertz resolution pattern.
Figure 11B:
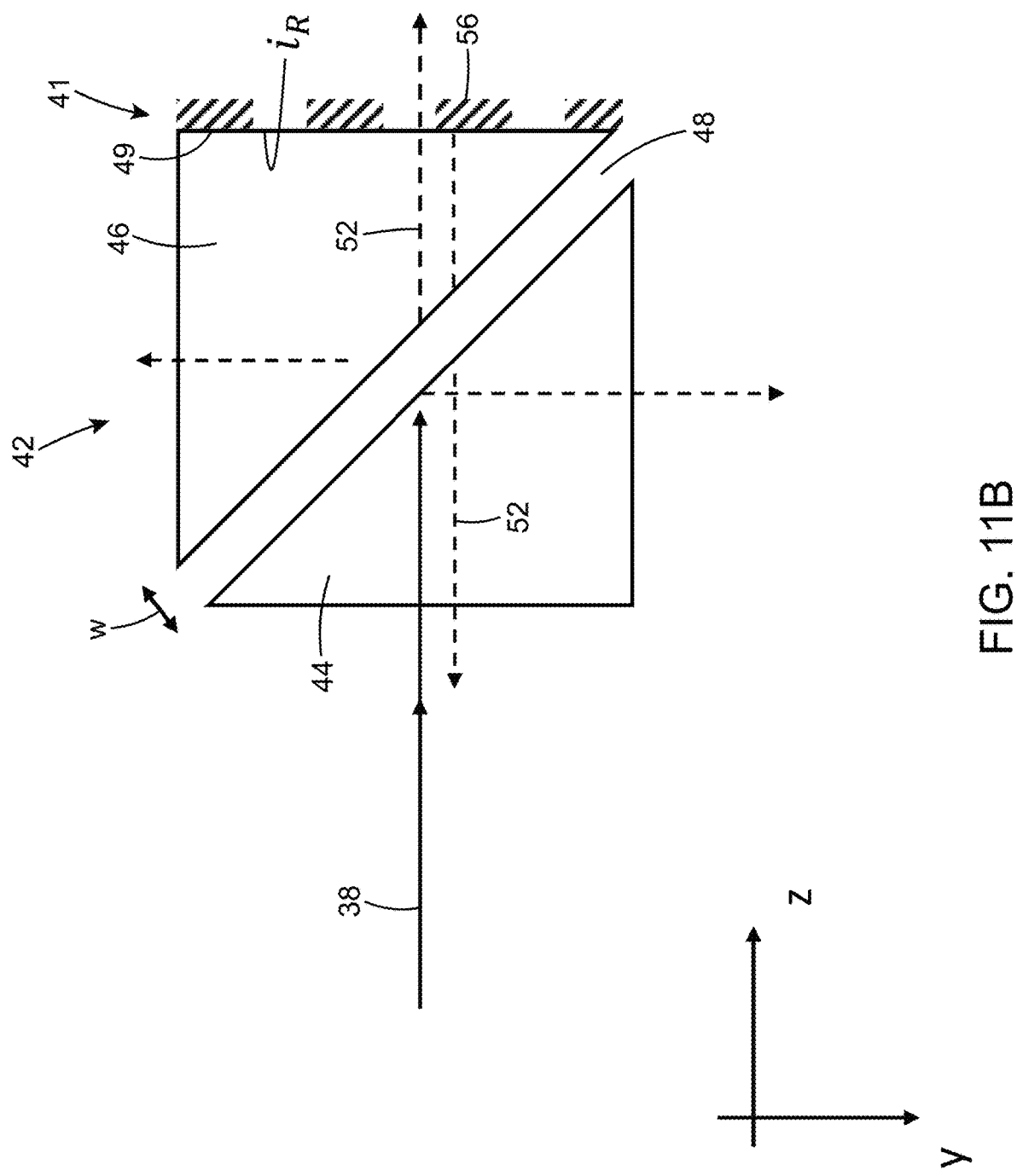
Figure 11C:
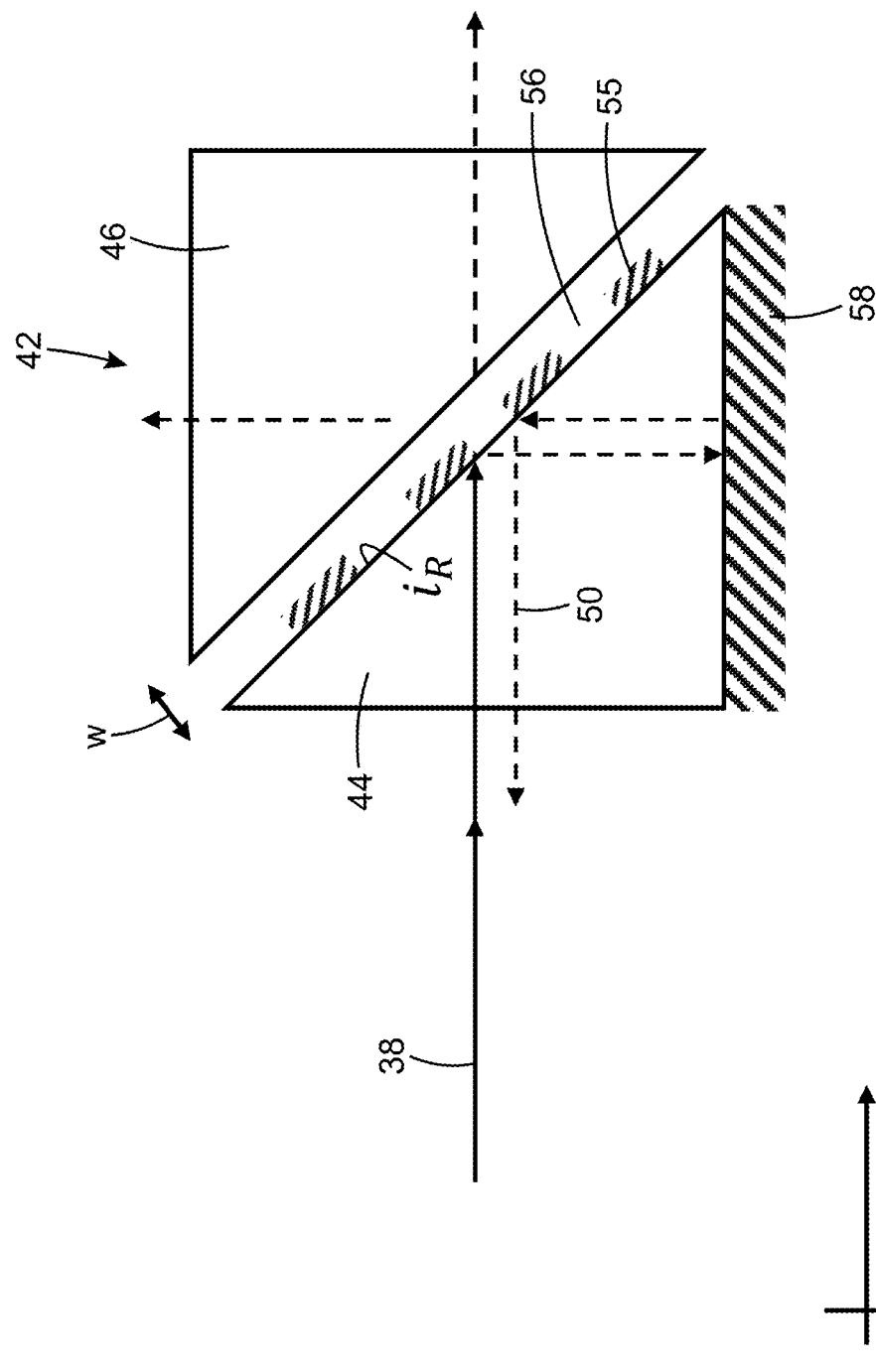

One skilled in the art will readily understand that the position of the terahertz resolution pattern is very flexible depending on the imaging system and method of analysis. The terahertz resolution pattern may be located on any one of the outer interfaces of the first or second prisms (front, side, rear). In some implementations, as for example shown in FIG. 11A, the terahertz resolution pattern 41 may be provided along an outer interface 49 of the first prism 44 and extends across the path of the reflected radiation beam 50 corresponding to a portion of the incident radiation beam 38 reflected by the first FTIR interface $i_1$. The terahertz resolution pattern may be in the form of a resolution mask as defined above or by a patterned reflective layer deposited directly on the interface 49, which defines an interface $i_R$, again providing for detection of the reflected beam 50. In this variant, the portion of the outer interface 49 reflecting the reflected beam 50 define the spatially distributed resolution features of the terahertz resolution patter 41. The frame 55 of the resolution mask or the patterned reflective layer defines the spatially distributed resolution features of this variant, and the terahertz resolution pattern also act as the reflector of previous embodiments. In other implementations, as for example shown in FIG. 11B, the terahertz resolution pattern 41 is provided along an outer interface 49 of the second prism 46 of the prism assembly 42 and extends across a path of a transmitted radiation beam 52 corresponding to a portion of the incident radiation beam 38 transmitted through the gap 48 by evanescent wave coupling, the distributed resolution features 56 reflecting the transmitted radiation beam 52. Still in other implementations, such as shown in FIG. 11C, the terahertz resolution pattern 41 may be provided along one of the first and second FTIR interfaces $i_1$ and $i_2$ of the prism assembly 42. In the illustrated variant, the terahertz resolution pattern 41 is embodied by a thin layer of reflective material deposited on the first FTIR interface $i_1$. It will be readily understood that in such variants, the layer embodying the terahertz resolution pattern 41 should by thin enough so as to allow the first and second FTIR interfaces $i_1$ and $i_2$ to be brought close enough for the evanescent wave coupling to take place.

Figure 12:
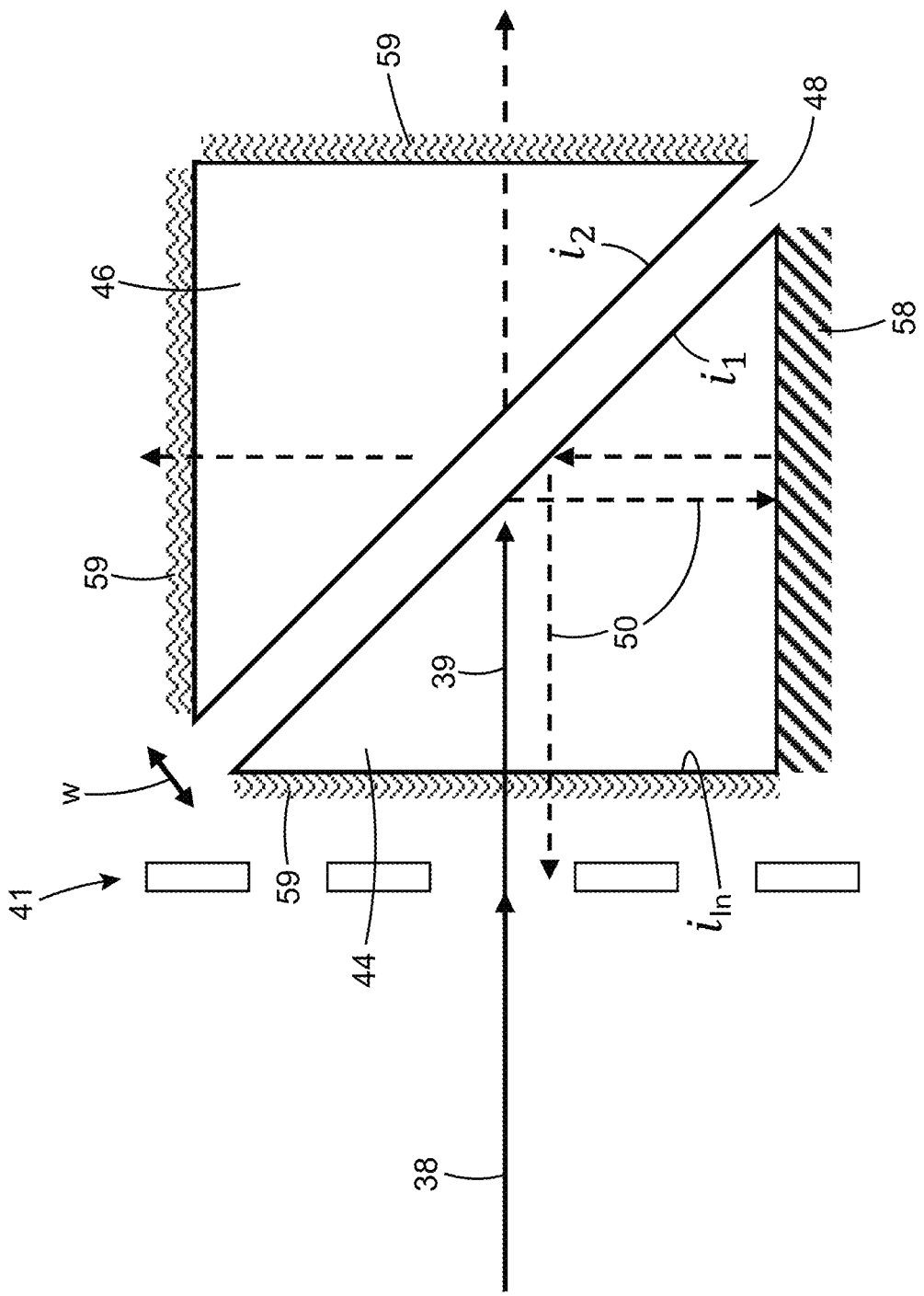
FIG. 12 is a schematized top view of a target device including an anti-reflection coating on non-reflective interfaces.

It will be readily understood that additional features and characteristics typically associated with optical components may be provided in conjunction with the prism assembly and/or terahertz resolution pattern, by way of example, with reference to FIG. 12, in some implementations an anti-reflection coating 59 may be provided on any surface of the first or second prisms 44 or 46 which does not serve as a reflector, such as for example the input interface $i_{in}$.

Figure 13:
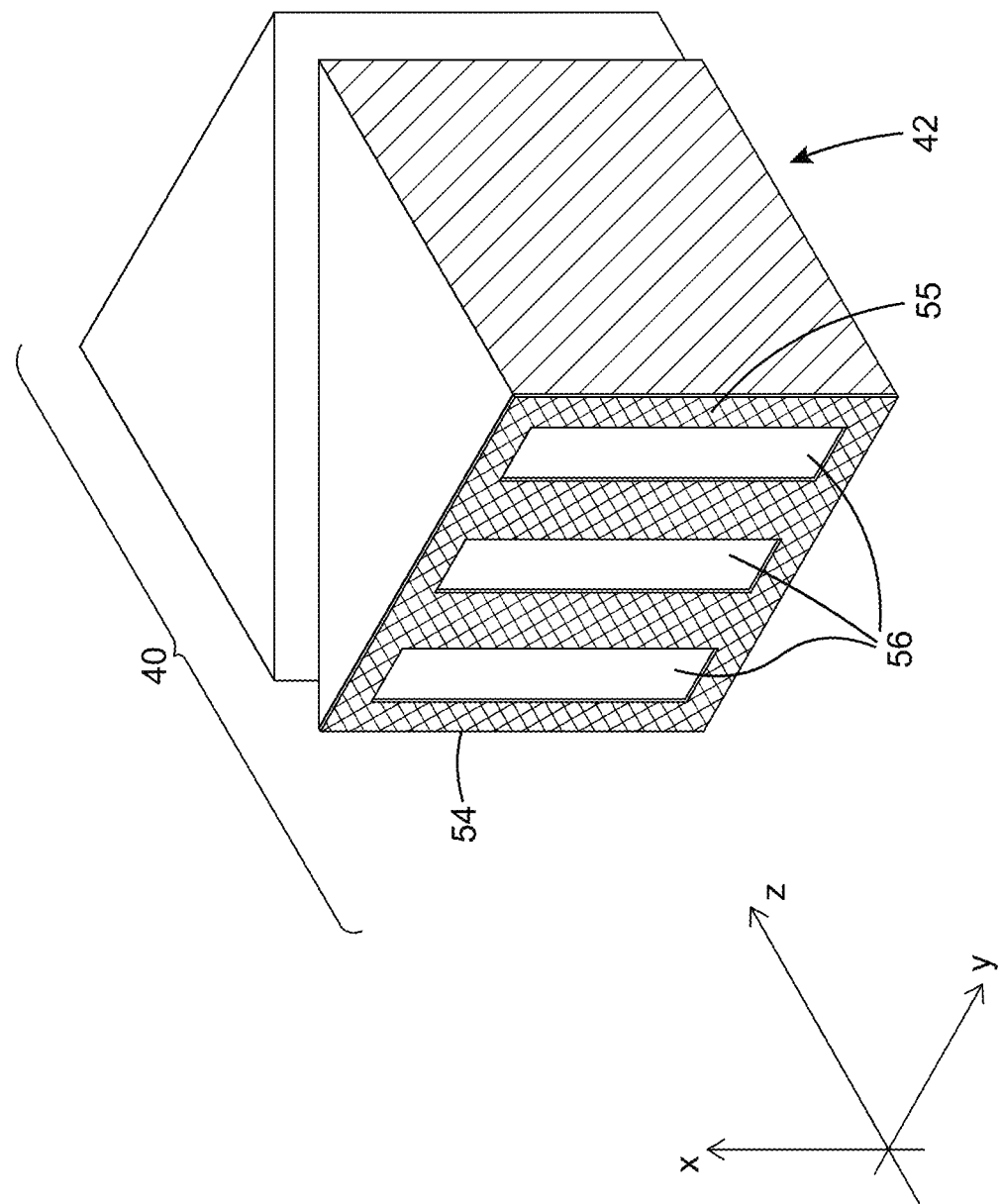
FIG. 13 is a schematized perspective view of a target device according to one embodiment and which is intended for use with an active imaging system operating in reflection mode.
Figure 14:
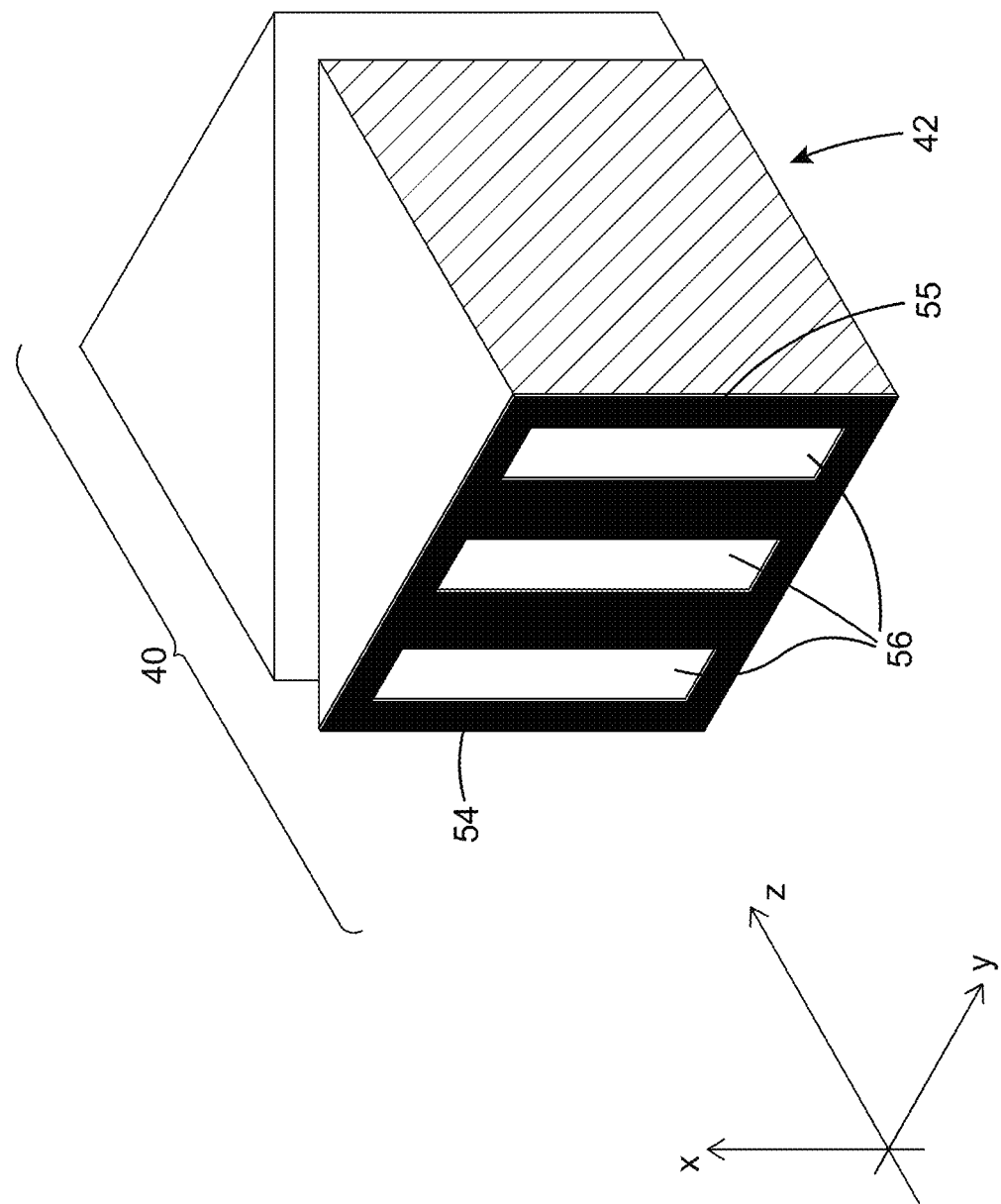
FIG. 14 is a schematized perspective view of a target device according to one embodiment wherein the resolution mask has an absorbing frame.

FIGS. 13A to 13F schematizes typical images that can be obtained using a target device 40 with an active imaging system used in reflection mode, detecting the returned reflected beam such as illustrated in FIG. 13. The target device 40 is shown including a resolution mask 54 including three rectangular shaped spatially distributed openings 56 forming vertical bars. FIGS. 13A to 13C show the expected contrast observable after imaging (front view) for the associated gap width w shown in FIGS. 13D to 13F between the two prisms 44 and 46. Low contrast is obtained when the gap 48 is large, as almost a same level of radiation is reflected through the openings 56 as the radiation reflected by the front surface of the frame 55 of the resolution mask 54. As the gap width w is reduced, the contrast increases. Contrast-tunable SNR measurements, such as the ones required in the NERD metric, can therefore be obtained. FIG. 14 to 14F show a configuration similar to that of FIG. 13, using a resolution mark 54 having a frame 55 may of an absorbing material. As can be seen, the resulting contrast image of FIGS. 14A to 14C is the negative of the image shown in FIGS. 13A to 13C.

Figure 15:
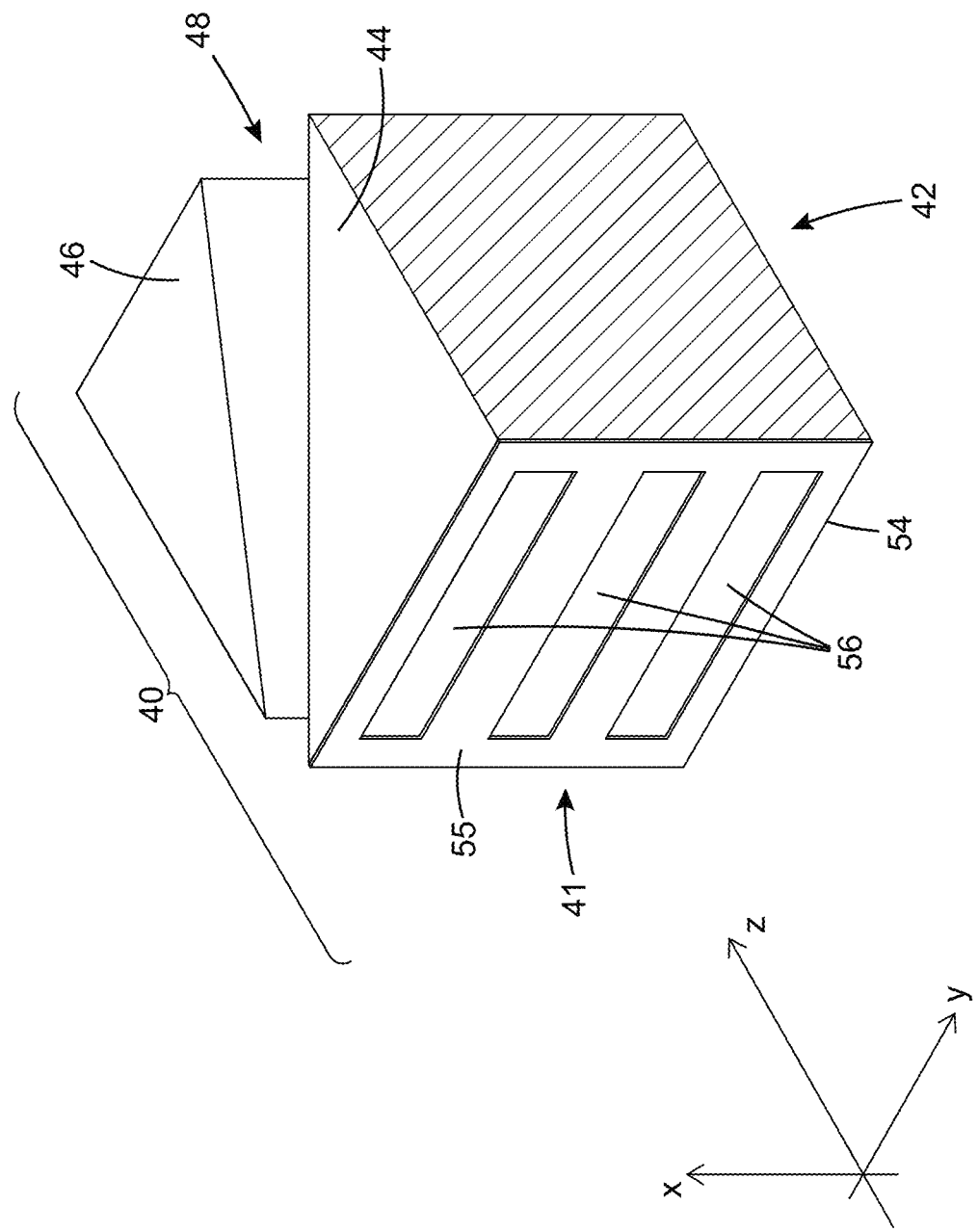
FIG. 15 is a schematized perspective view of a target device according to one embodiment, using a wedge-shaped prism configuration.
Figure 15B:
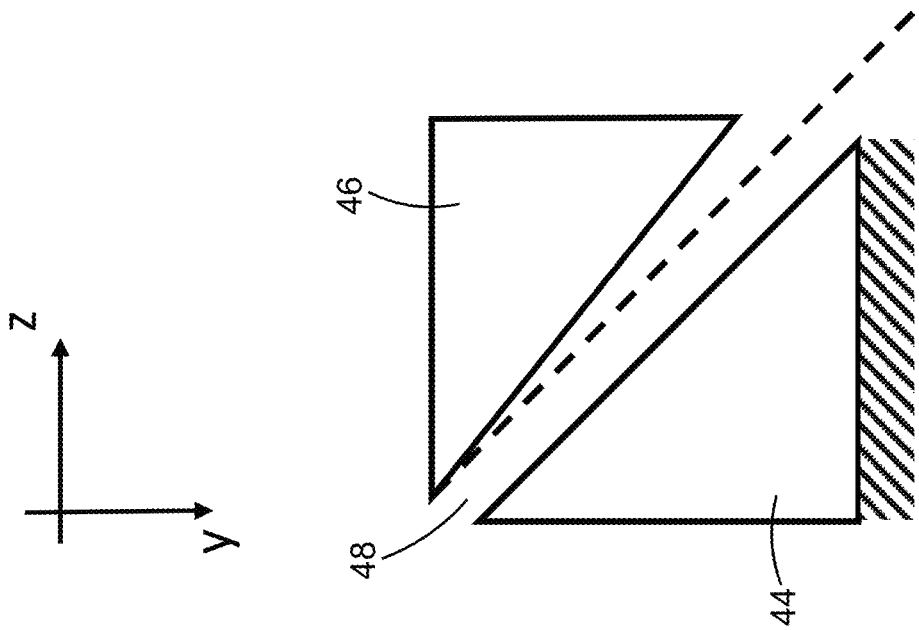
FIG. 15B is a top view of the prism assembly of the target device of FIG. 15.
Figure 15A:
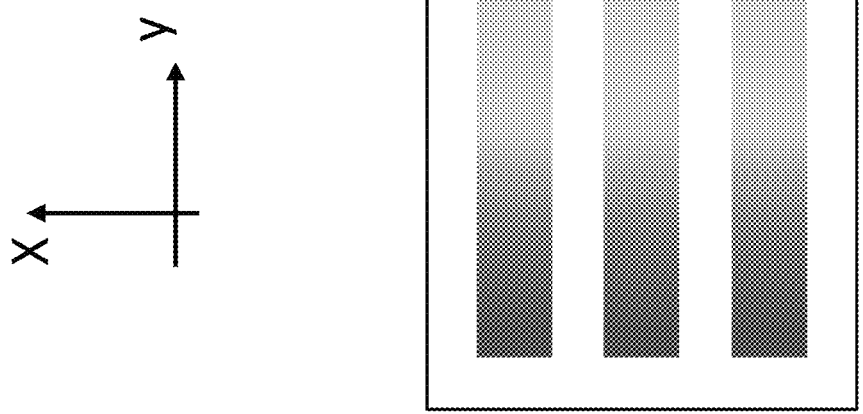
FIG. 15A schematizes a typical image that can be obtained using the target device of FIG. 15.

Referring to FIG. 15. There is another example of a configuration similar to that of FIG. 13, using a prism assembly 42 in which the gap 48 between the first and second prisms 44 and 46 is wedge-shaped. Spatially distributed features 56 of the terahertz resolution pattern 41 defines a bar pattern having its elongated axis parallel to the wedged gap variation. In this manner, the bar pattern can be observed (see FIG. 15A) in the resulting image as having a slowly varying contrast along each bar as the gap width varies. The front view shows a sketch of expected results which can create spatial frequency patterns with varying modulation levels.

Figure 16A:
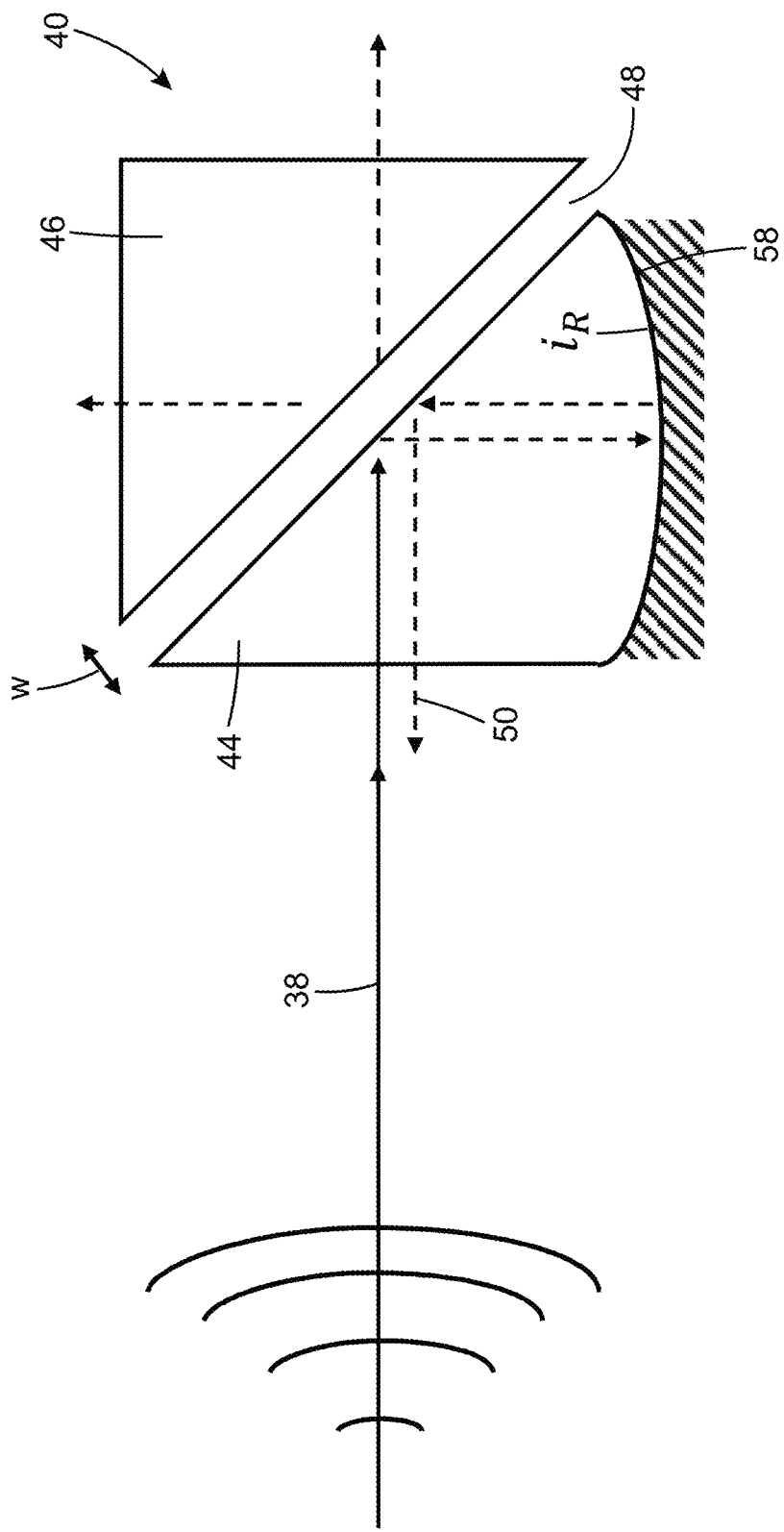
FIG. 16A is a schematized top view of a target device used in reflective mode, wherein the reflector is provided on a curved interface.
Figure 16B:
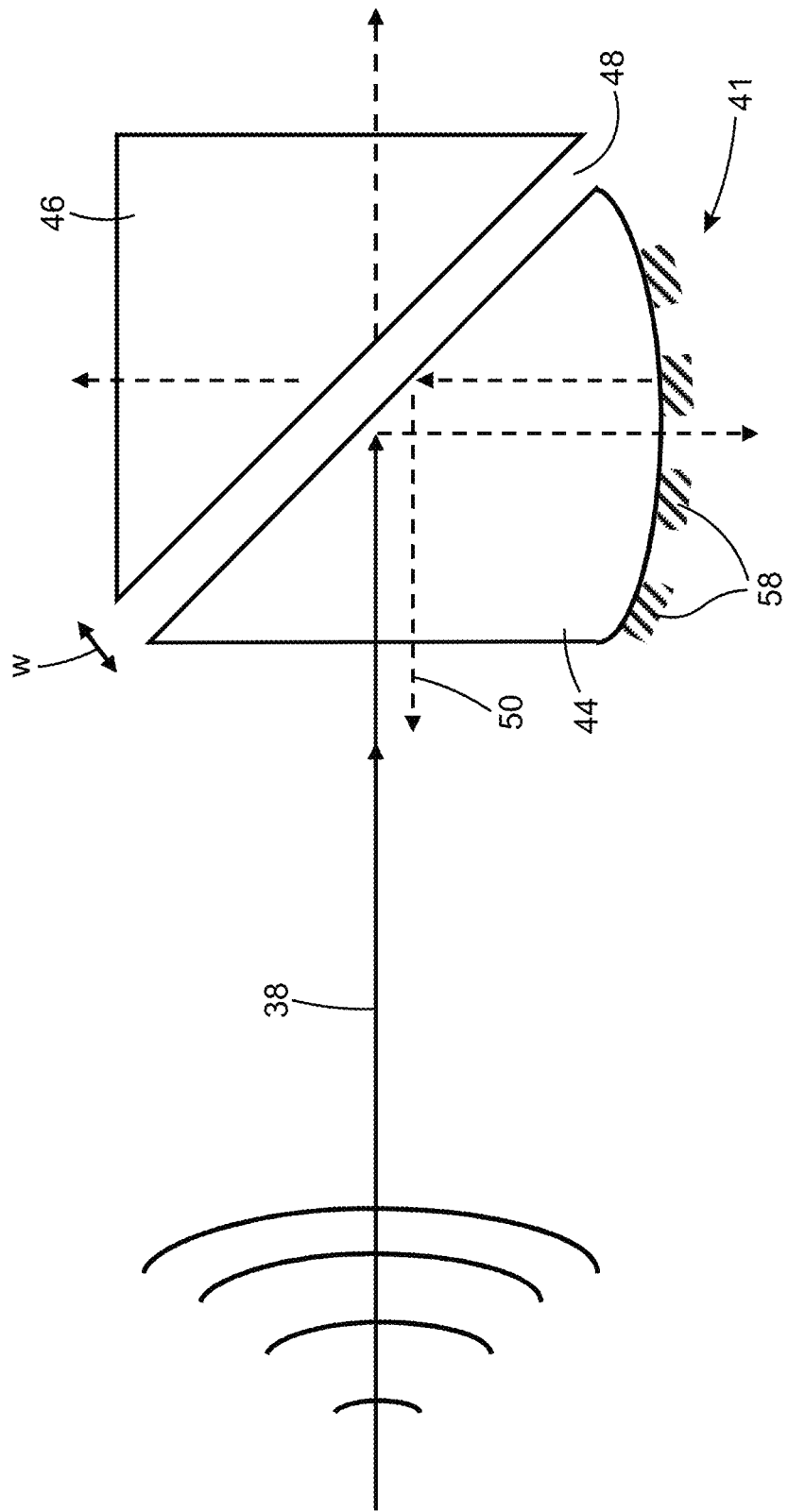
FIG. 16B shows a similar configuration wherein the curved interface provides the terahertz resolution pattern.
Figure 16C:
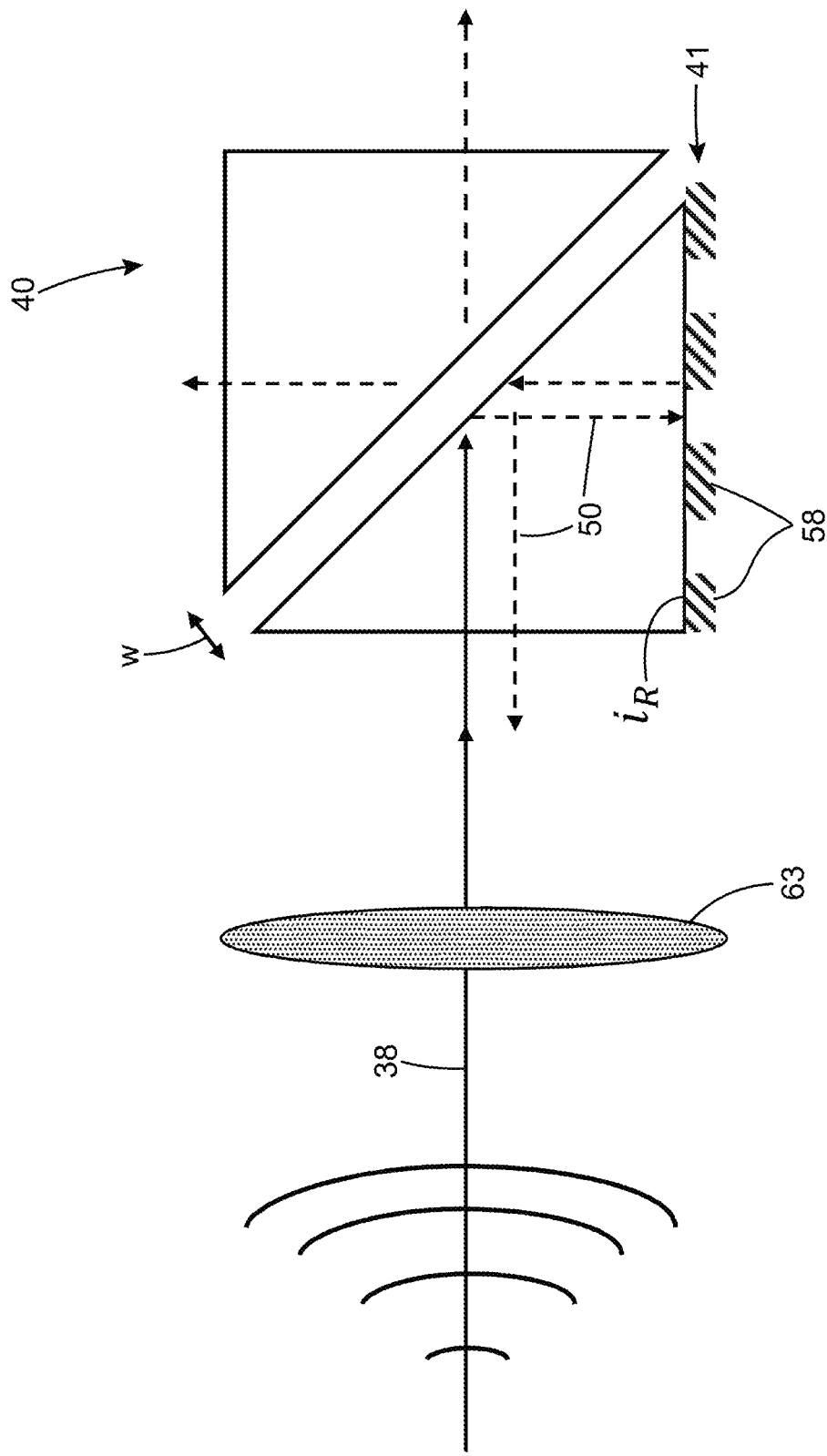
FIG. 16C shows the use of a wavefront-flattening field lens in the path of the incident radiation beam.

The reflection of terahertz and sub-terahertz radiation by most surfaces is very specular. In an active imaging system operating in reflection mode, the imaging radiation field may have a diverging wavefront, which affects the collection of radiation when the relative orientation of the target is such that the reflected radiation is not directed towards the collecting aperture of the imaging system. In some embodiments, the design of the target device may be optimized to avoid this issue and/or to maximize the amount of radiation collected by the imaging system. Referring to FIG. 16A, in one example of a target device 40 used in reflective mode, the reflector 58 provided on the interface $i_R$ of the first prism 44 has a curvature substantially matching the wavefront of the incident radiation beam 38. With this approach, specular reflections will be directed back into the collection aperture of the imaging system. As described in a previous embodiment, the curved surface of the reflector 58 may also embody the terahertz resolution pattern 41, as illustrated in FIG. 16B. Referring to FIG. 16C there is shown another approach to deal with a curved wavefront and specular reflections in which a properly designed field lens 63 is positioned in front of the target device 40. The field lens 63 spatially flattens the wavefront of the incident radiation beam 38, therefore providing a similar improvement in radiation collection as the previous variants while conserving the simplicity of a flat interface $i_R$.

In some implementations, the target device may include multiple prism assemblies.

Referring to FIG. 17A, there is shown an example of a target device 40 including four prism assemblies 42a, 42b, 42c and 42d, arranged in a 2×2 bidimensional array and mounted on a rigid support 67. The gap width w of each prism assembly 42a, 42b, 42c and 42d is independently adjustable, such that the target device 40 defines a 2D characterization target map. FIG. 17B shows the top two prism assemblies 42a and 42b with their respective gap 48 adjusted to different gap widths w, and FIG. 17C shows the imaging view showing the gray mapping levels obtained. In this embodiment, each one of the prism assemblies features of the terahertz resolution pattern. In some variants, each prism assembly 42a, 42b, 42c and 42d defines one of the resolution features of the terahertz resolution pattern. In some variants, each prism assembly 42a, 42b, 42c and 42d, may be additionally associated with a resolution mask according to any of the embodiments above depending on the optical system performance assessment desired for a given application. Various mappings may be performed through different combinations of contrasts and resolution patterns. Referring to FIG. 17D, there is shown a first example where the contrast is the same for all prism assemblies and the resolution pattern varied from one assembly to the other. Another example provides a gray level variable from one assembly to the next while having a same resolution pattern, such as shown in FIG. 17E.

Figure 18A:
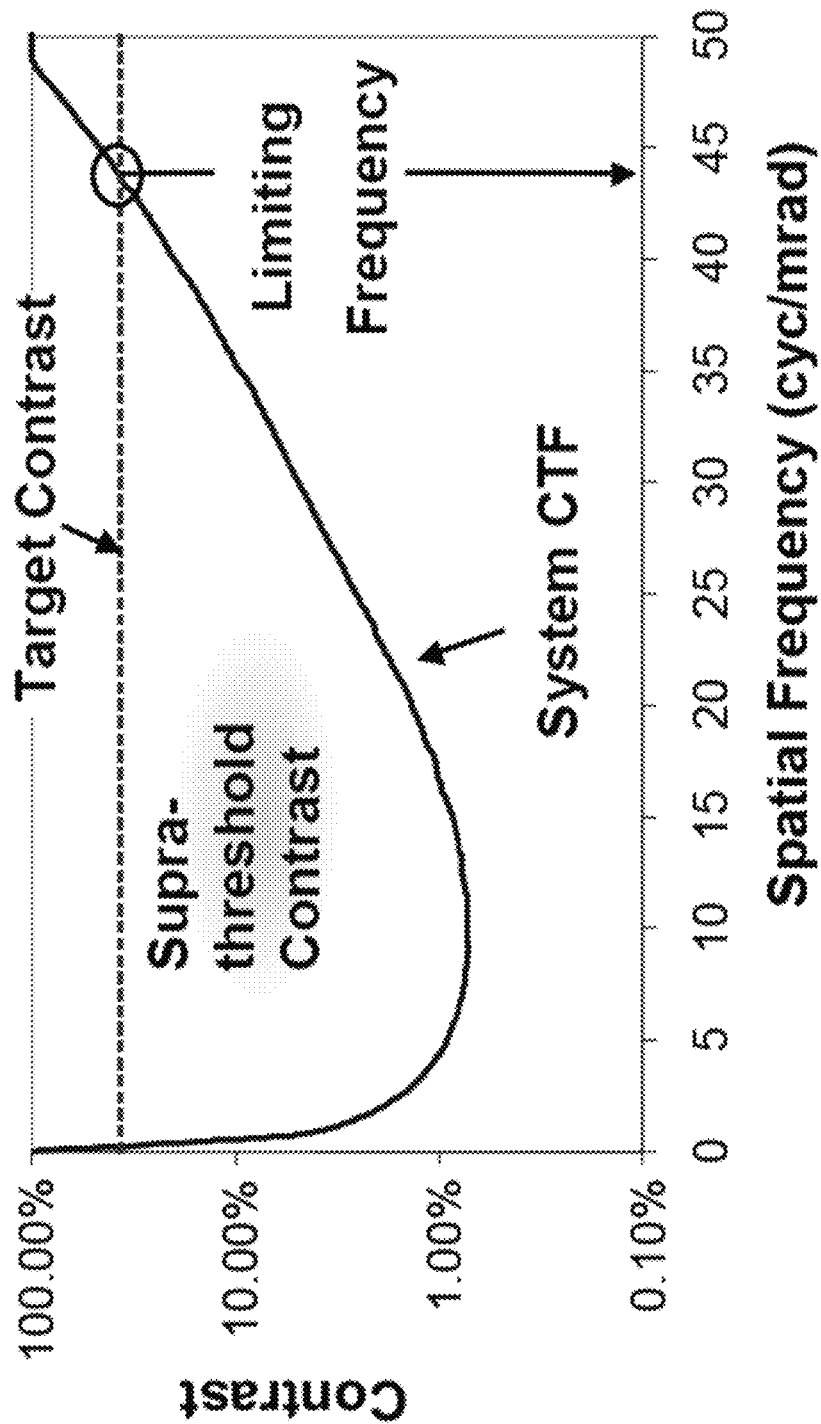
FIGS. 18A and 18B illustrate the use of a target device having a 3×4 array of prism assemblies for which the resolution pattern varies along the rows of the array while the contrast varies along the columns.
Figure 18B:
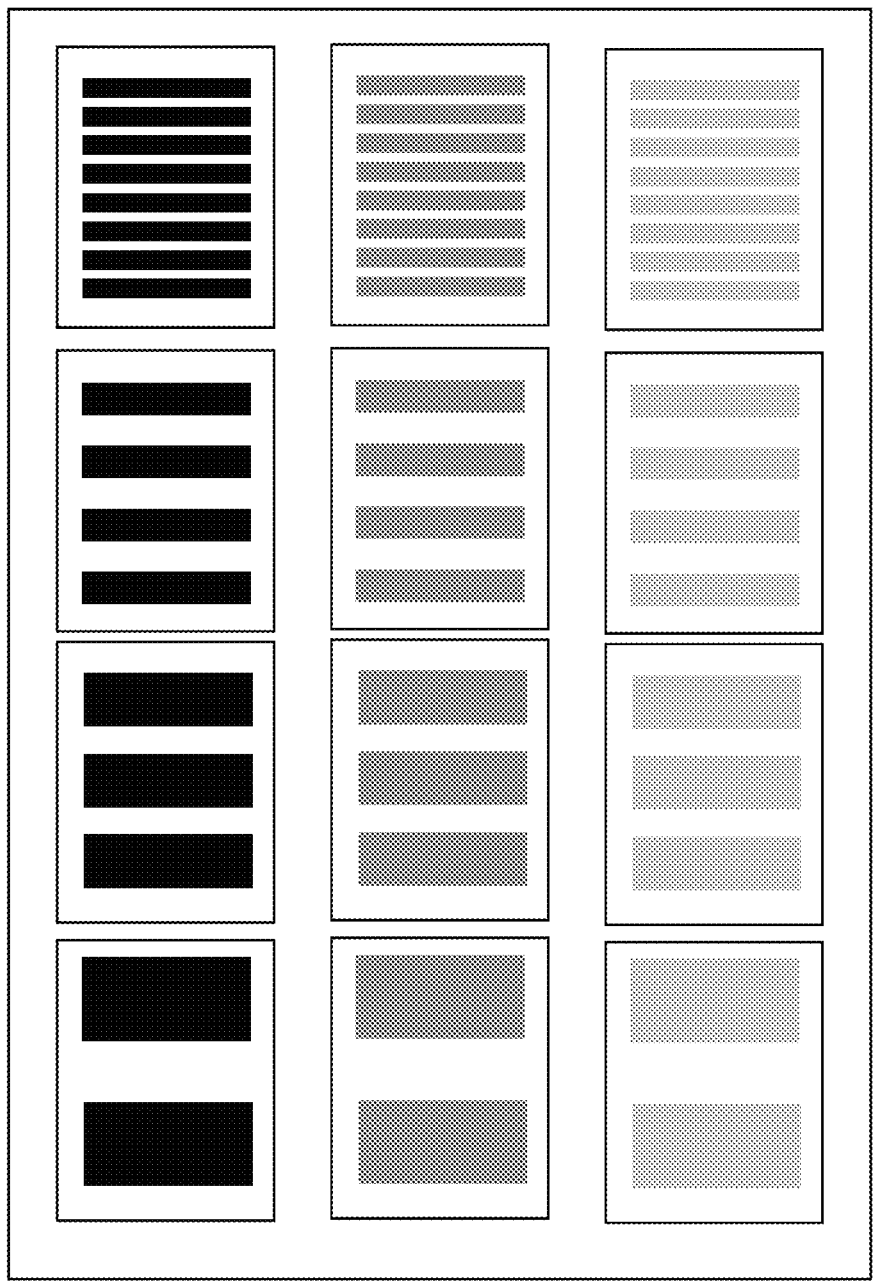

In some implementations, a mapping where both contrast levels and resolution patterns are different from one assembly to the next can also be used to provide information on the contrast transfer function (CTF), which is a plot of spatial frequency variation and contrast shown in FIG. 18A and the associated target device possible arrangement shown in FIG. 18B. In the example of FIG. 18B, the resolution pattern varies along the rows of the array, whereas the contrast varies along the columns.

Figure 19:
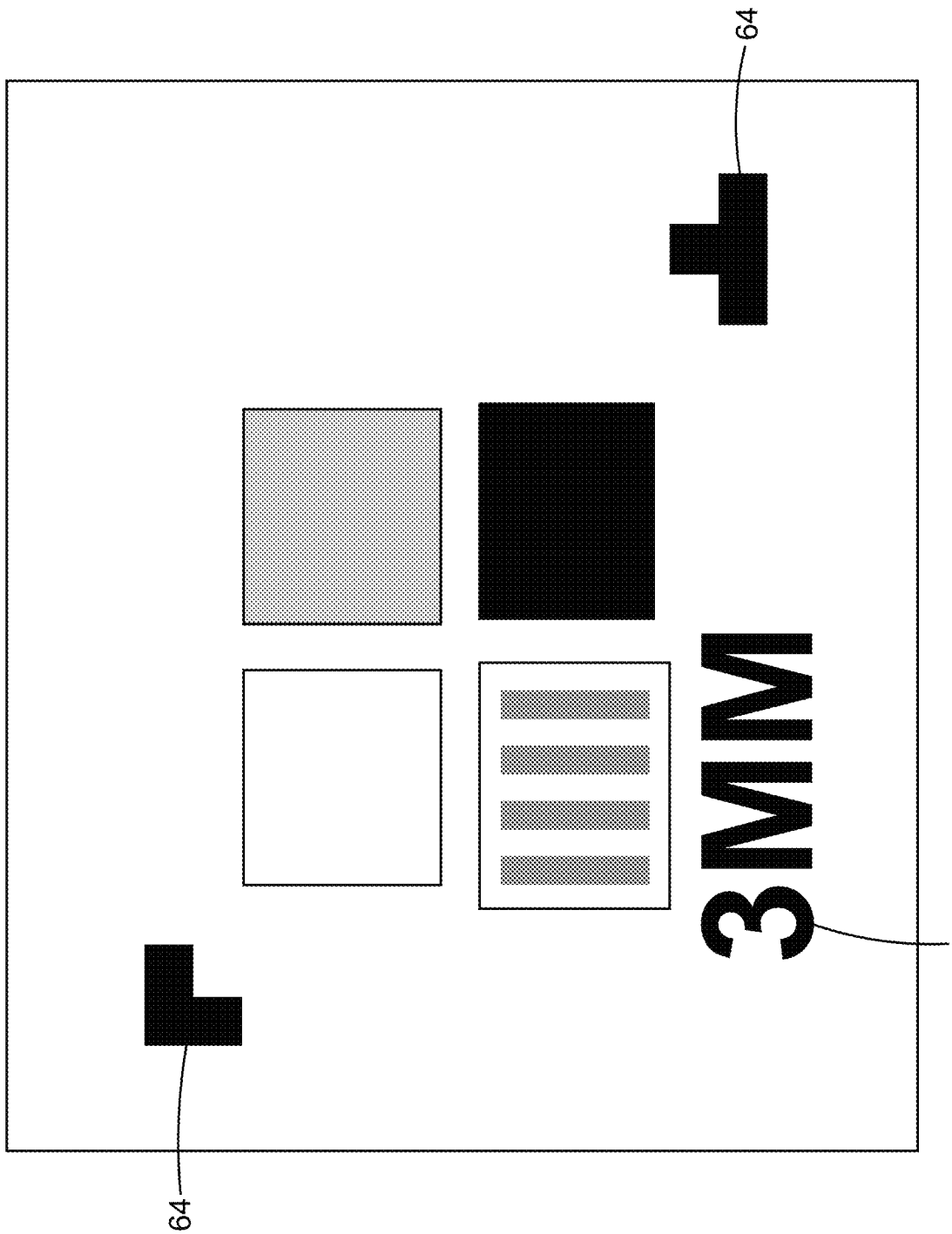
FIG. 19 illustrates a target device including fiducial markers.

Referring to FIG. 19, in some implementations the target device may include one or more fiducial markers 64 for orientation identification. Identification marker 66 providing additional information on target characteristics may additionally be provided. For example, the 3 mm periodic target pitch is shown in FIG. 19.

Figure 20:
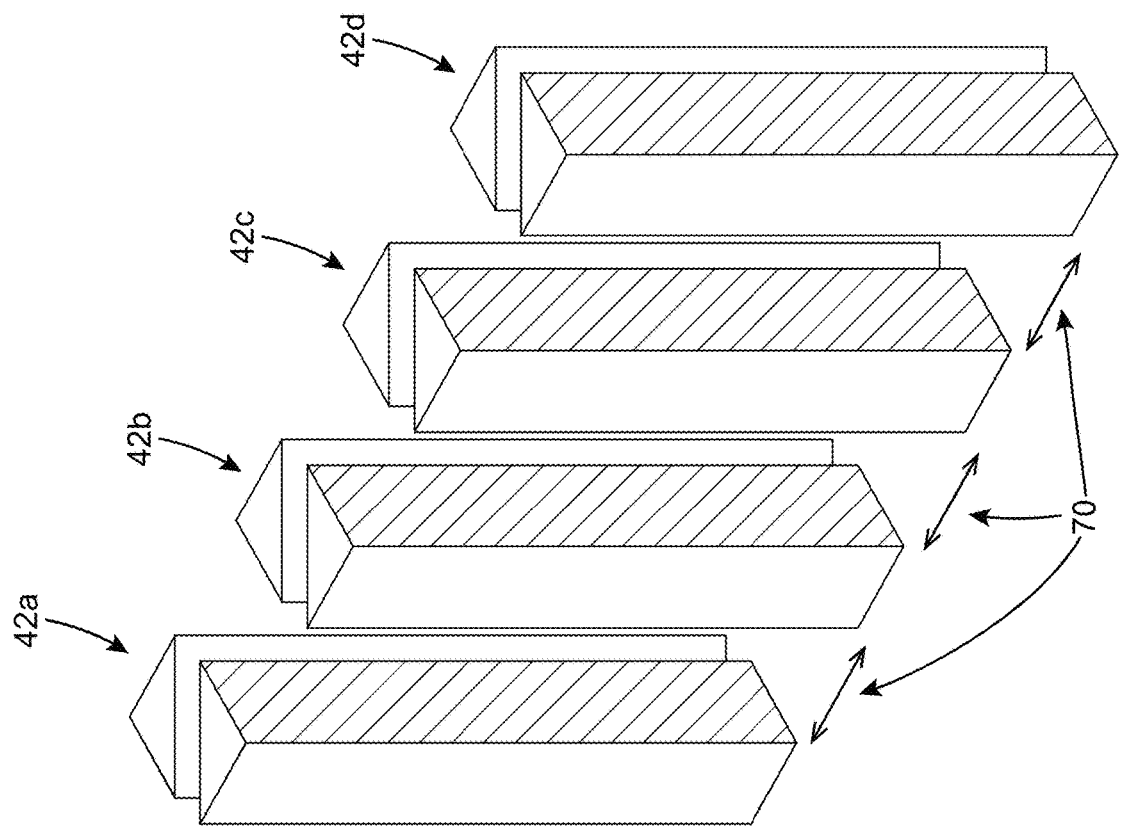
FIG. 20 is a schematized perspective view of a target device having four prism assemblies disposed side-by-side for producing the terahertz resolution pattern.
Figure 20:
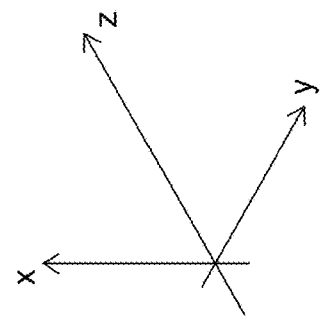

Referring to FIGS. 20 to 20F, there is shown another variant where the prism assemblies may be spatially distributed such that each prism assembly defines one of the resolution features of the terahertz resolution pattern. For example, as seen in FIG. 20, bar-shaped elongated prism assemblies 42a, 42b, 42c and 42d could be held adjacently or separated by a space 70 along the y reference axis in order to form a periodic pattern. FIGS. 20A to 20C shown different type of resolution patterns which may be obtain through a distribution and/or size variation of the prisms assemblies 42a, 42b, 42c and 42d as shown in FIGS. 20D to 20F. The target pitches could be set equal set or could be varied in order to produce a specific signal. This example is shown for a reflection configuration similar to that of FIG. 13, but it will be readily understood that it can be used in other imaging configurations in alternative embodiments.

Figure 21B:
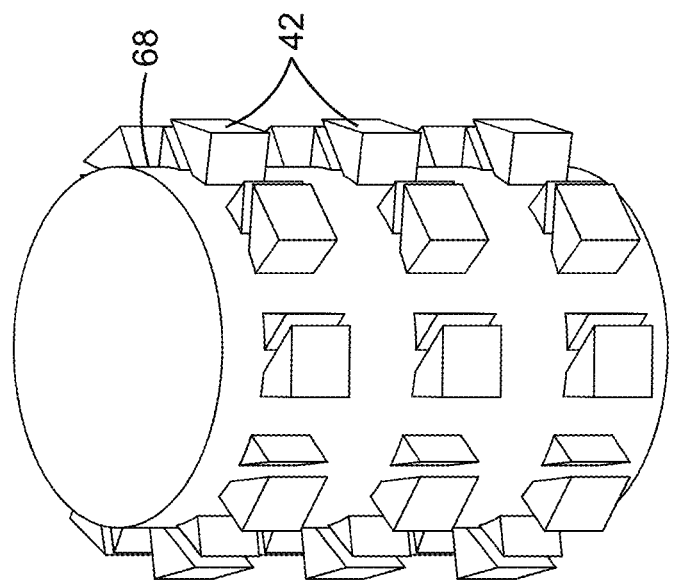
FIGS. 21A and 21B are respective top and side perspective views of a target device comprising a cylindrical holder and a plurality of prism assemblies mounted thereon.
Figure 21A:
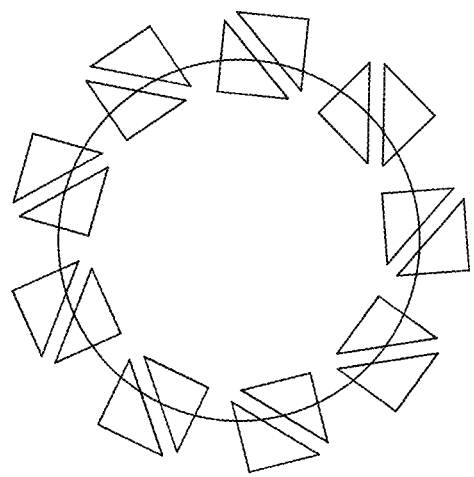

In other variants, a 3D target device can also be constructed. Referring to FIGS. 21A and 21B, in some implementations, the target device 40 may include a cylindrical holder 68, and multiple prism assemblies 42 and associated resolution patterns are mounted around its outer surface. Again, various mapping combinations of contrast and resolution can be used. This embodiment may be useful for characterizing imaging systems having a scanning system with cylindrical geometry. The insertion in a system for test can be aligned with mechanical fiducials.

Experimental Results

A prism assembly similar to the one of FIG. 10 was used for experiment purposes. The prism assembly is an arrangement of two HDPE prisms with 45° angle with flat and parallel surfaces. The first prism is fixed and has a flat mirror made of an aluminum metal sheet abutted to the interface $i_R$. The second prism is mounted on a manual translation stage. The experimental set-up was configured similarly to that shown in FIG. 10A, and the detected image therefore corresponds to the reflected radiation beam, having suffered losses through evanescent waves at both instances of reflection at the interface $i_1$. These losses dependent on the width of the gap, more radiation escaping the closer the first and second prisms are brought to each other.

Figure 22A:
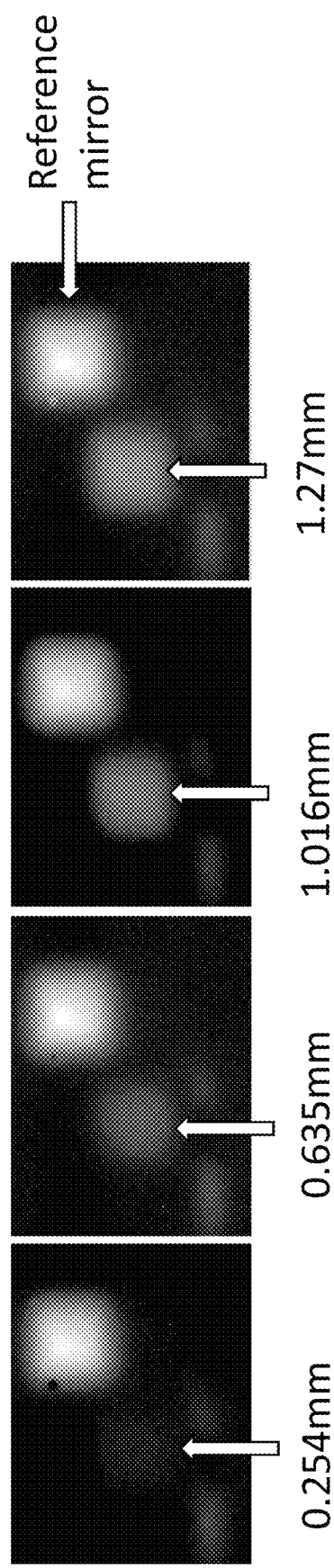
FIGS. 22A to 22C show experimental results obtained using the prototype of FIG. 10.
Figure 22B:
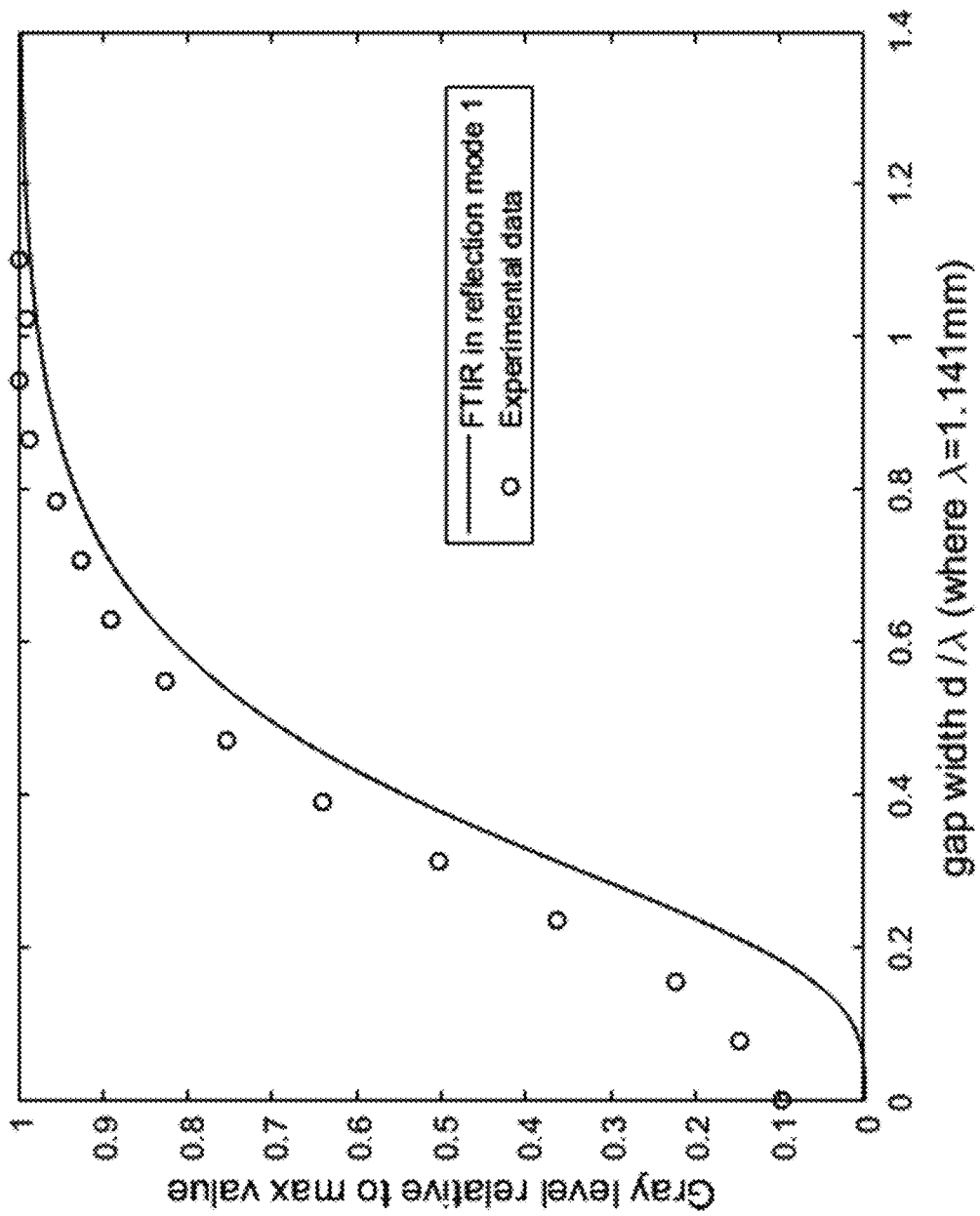
Figure 22C:
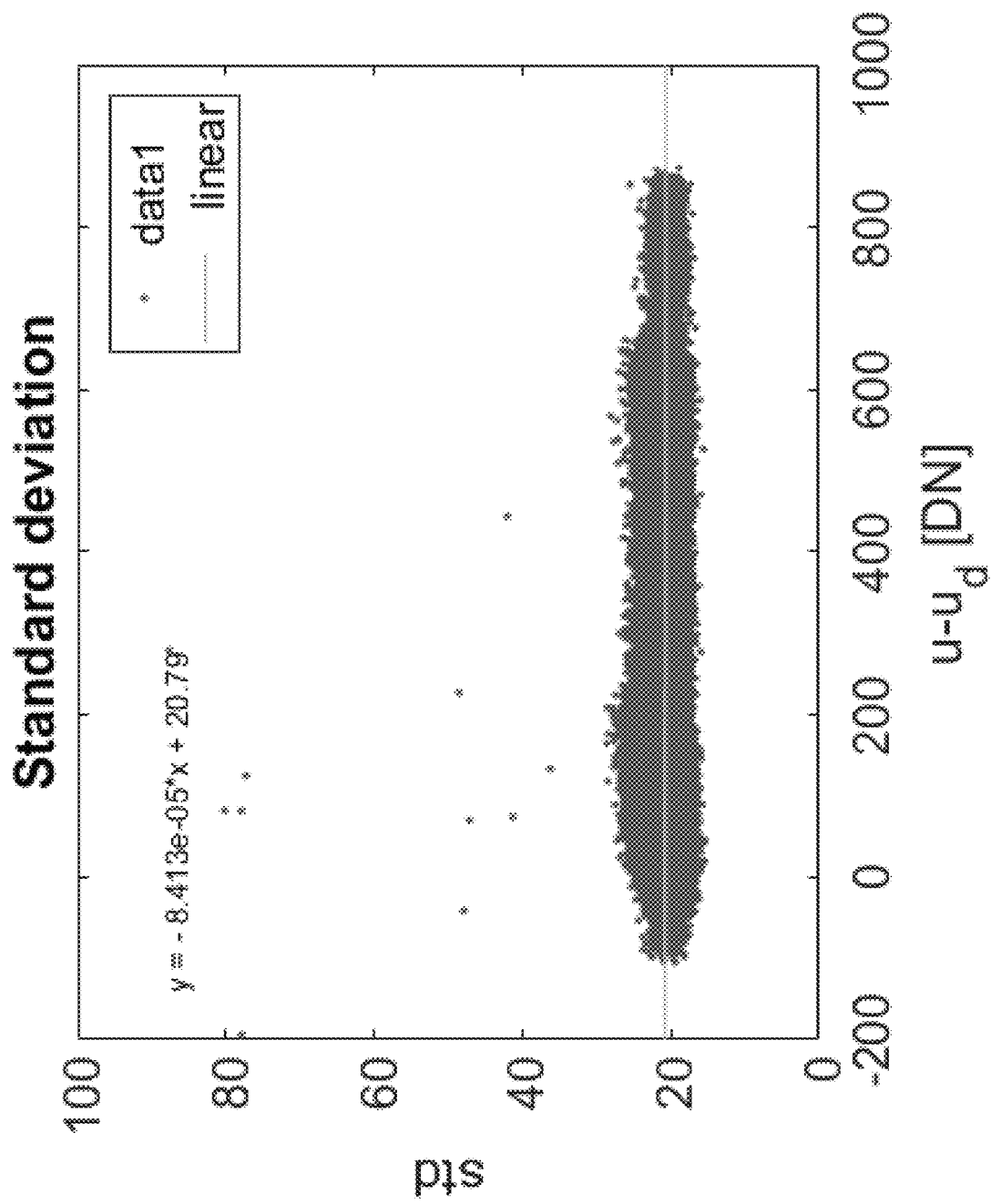

FIGS. 22A through 22C shows the imaging results obtained from the prism assembly of FIG. 10, using an active imaging system operating in reflection mode. In these experiments the resolution mask was omitted in order to clearly demonstrate the feasibility and control in gray level on a simple target shape, which can provide metrics for imaging system characterization (OECF, SNR, dynamic range (DR), etc.). Referring to FIG. 22A, images taken with four different discrete gap widths are presented, showing that indeed, the larger the gap, the more intense the reflected radiation beam as it suffers lower losses at the interface $i_1$. The white square on top right of each image corresponds to a reference mirror made of aluminum metal sheet which has a very high reflectivity. It will be understood that some absorption from the prism material may occur, such that the reflected radiation beam obtained when the gap width provides the highest reflectivity may be darker than the image of the reference mirror.

FIG. 22B is a graph of the experimentally obtained relative gray levels for 15 discrete values of the gap width, from contact between the first and second prisms to a gap width larger than 1.10 (d/λ). The solid line is the theoretical curve, plotted using a model adapted from J. J. Brady et al, J. Opt. Soc. Am. 50, 1080-1084 (1960) cited above, for the imaging configuration of the system. The observed discrepancies can be attributed to factors such as for example the assumption of the model of perfect anti-reflection coatings on the various interfaces encountered by the radiation beam. In addition, the model does not consider absorption from the material of the first prism, which follows a Beer-Lambert law. The state of polarization from an active source is preferably known a priori for proper modelling. The model and experimental set up used an approximately unpolarized source, which means that both the parallel and perpendicular components of the electric field contain about 50% of the energy of the incident radiation beam. Refinements in the model are possible, and initial observations seem to indicate that the behavior of the reflection is predictable using a mathematical model. The shape of the gray level curve is close to a sigmoid. Some linear interpolation is reasonable in certain portions of the curve or a numerical fitted function can be used. In other implementations, a look-up table built in a calibration step may also be considered.

FIG. 22C illustrates the temporal noise standard deviation (std) to the average intensity relation for the data shown in FIG. 22B. The standard deviation of temporal intensity values can be computed for each pixel in the image area. An estimate of the average intensity of each pixel over a temporal sequence can also be computed. This estimation may be performed by computing the average intensity recorded when the illumination system is on (μ), and subtracting the average intensity recorded when the radiation source is off ($\mu_d$). The relationship between standard deviation and average intensity ($\mu-\mu_d$) plotted in FIG. 23C shows that the noise level is independent of intensity. An SNR estimate can also be computed by dividing the intensities with the noise std.

Method for Assessing the Performance of an Imaging System

In accordance with one aspect, there is provided a method for assessing the performance of a terahertz imaging system using a target device according to any of the embodiments described above, or the like.

Figure 23:
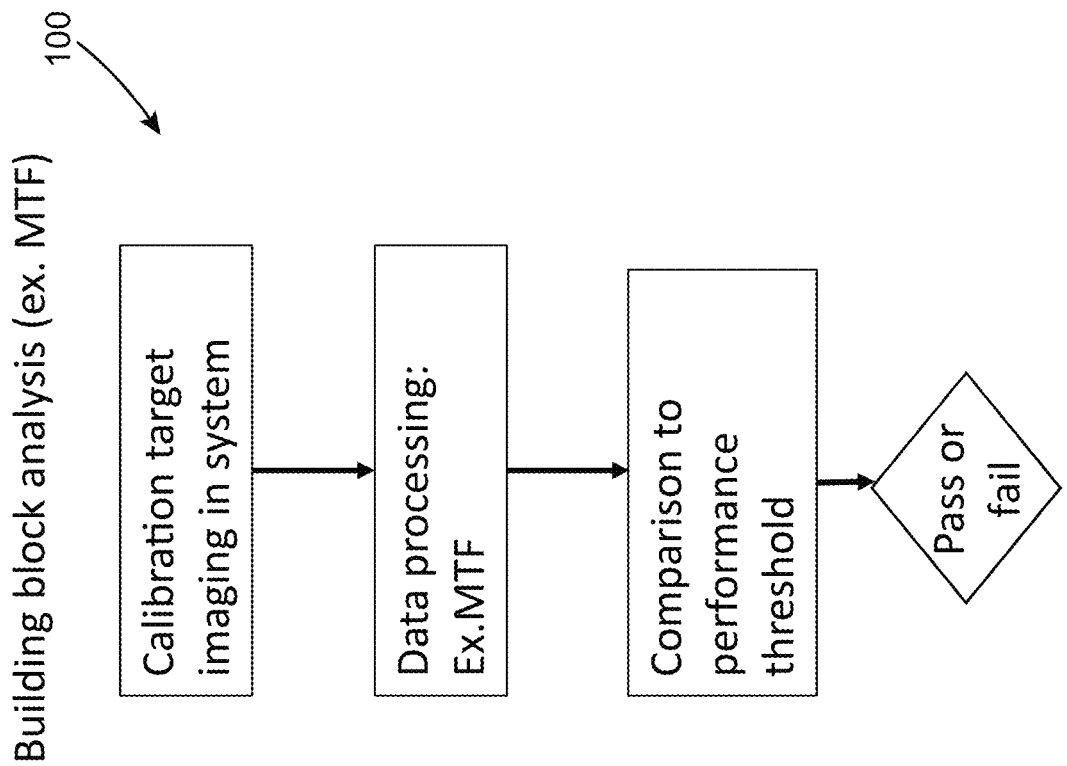
FIG. 23 is a block diagram of a method for assessing the performance of a terahertz imaging system using a target device according to any of the embodiments described herein.

Referring to FIG. 23, a flow chart of such a method 100 according to one implementation is presented. By way of example, a target device including a combination of four (2×2) prism assemblies with overlaid resolution masks (see FIGS. 17A to 17E) is considered. One step of the method may involve measuring a signal modulation for each bar pattern (spectral SNR, CTF or NERD-like metric) and compare this measure to a predefined threshold. Each pattern modulation intensity (varied by the changing the gap width of the associated prism assembly) may be initially set such that an imaging system is barely able to resolve the pattern in normal conditions. The bar patterns may also be used for estimating the system MTF by setting each prism assembly back to a maximum contrast. Departure from expected modulation values could point to a defective system or trigger preventive maintenance.

The previously discussed method could be valuable in the context of commercial equipment performance monitoring and servicing. It could also be used in the research and development field, where one would want to assess the performance of newly designed millimeter-wave imaging system prototypes.

Target devices according to some implementations may also be used to validate, in a single measurement, the possibility of resolving a pattern at certain critical spatial frequenc(y)ies and for a certain modulation (contrast) level. This is akin to probing the system's contrast threshold function (CTF), as shown at FIG. 18A).

Figure 24:
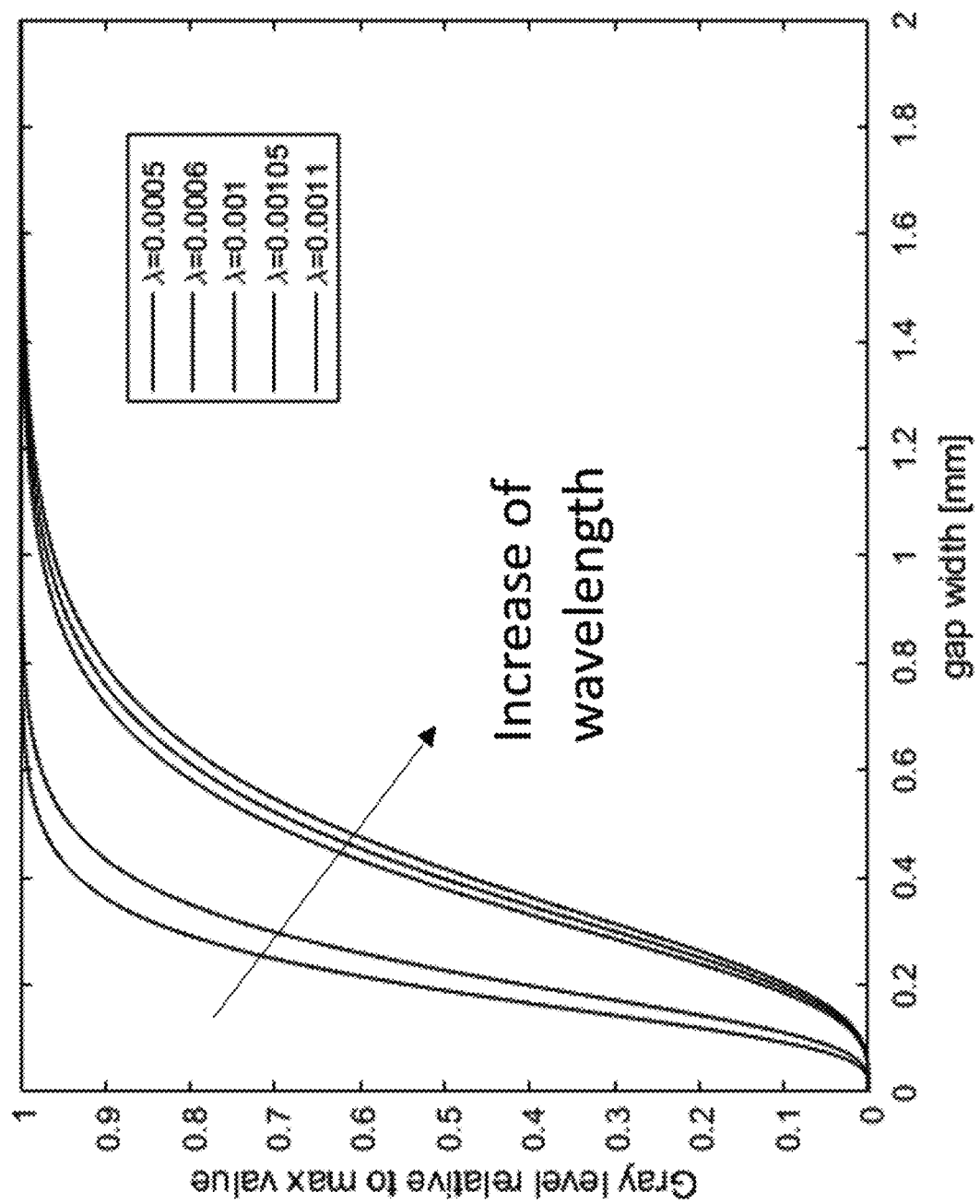
FIG. 24 is a graph showing the results of numerical simulations for the gray level as a function of gap width, for different wavelengths.

One additional characterization capability of the target device is that it can act as a coarse wavemeter, i.e. being able to identify the wavelength of the radiation shining therethrough. The variation of gray level with the gap width for a known prism geometry and refractive index can be predicted by modelling. By applying a best fit of the model to experimental data this can allow identification of the wavelength of illumination. A numerical simulation example is shown in FIG. 24. Wavelength is varied for a model of a prism assembly made of HDPE for discrete set of wavelengths: 0.5 mm, 0.6 mm, 1.00 mm, 1.05 mm and 1.10 mm. Typically, the radiation source wavelength is known a priori, but this metric can also be extracted if needed by the prism assembly.

Of course, numerous modifications could be made to the embodiments described above without departing from the scope of protection.

The invention claimed is:

1. A target device for characterizing a terahertz imaging system under test using terahertz radiation, the target device comprising:
   a terahertz resolution pattern having spatially distributed resolution features configured to transmit or to reflect the terahertz radiation;
   at least one prism assembly coupled to the terahertz resolution pattern, each of the at least one prism assembly being arranged in a Frustrated Total Internal Reflection (FTIR) configuration and comprising:
      a first prism made of a material having a first refractive index $n_1$ for said terahertz radiation, the first prism having outer interfaces and a first FTIR interface $i_1$, one of the outer interfaces of the first prism defining an input interface of said prism assembly, said input interface being positioned to receive an incident terahertz radiation beam; and
      a second prism made of a material having a second refractive index $n_2$ for said terahertz radiation, the second prism having outer interfaces and a second FTIR interface $i_2$,
   wherein the FTIR configuration comprises the first FTIR interface $i_1$ and the second FTIR interface $i_2$ facing each other and separated by a gap having a variable width, and
   wherein the terahertz resolution pattern is provided along the input interface of each of the at least one prism assembly, the spatially distributed resolution features allowing the incident terahertz radiation beam to be transmitted therethrough, thus providing a patterned terahertz radiation beam;
   whereby when in use to characterize the terahertz imaging system under test with said terahertz radiation, said target device provides contrast images of the resolution features with a variable contrast determined by the variable width of the gap.

2. The target device according to claim 1, wherein the variable width of the gap is defined by a fixed variation of a distance between the first FTIR interface and the second FTIR interface.

3. The target device according to claim 2, wherein the first FTIR interface and the second FTIR interface are oriented at an angle, the gap thereby having a wedge shape.

4. The target device according to claim 1, wherein the variable width of the gap is defined by an adjustable variation of a distance between the first FTIR interface and the second FTIR interface.

5. The target device according to claim 4, wherein each of the at least one prism assembly comprises a gap width adjustment mechanism configured to vary the distance between the first FTIR interface and the second FTIR interface.

6. The target device according to claim 5, wherein the gap width adjustment mechanism comprises a translation stage for moving one of the first and the second prisms relative to the other.

7. The target device according to claim 1, comprising at least one resolution mask, each of the at least one resolution mask having a frame and a plurality of openings through said frame, the openings of the at least one resolution mask providing the resolution features of the terahertz resolution pattern.

8. The target device according to claim 1, wherein the terahertz resolution pattern comprises a patterned reflective layer.

9. The target device according to claim 1, further comprising a reflector provided across a path of a reflected radiation beam, the reflected radiation beam corresponding to a portion of the patterned terahertz radiation beam reflected by the first FTIR interface.

10. The target device according to claim 1, further comprising a reflector provided across a path of a transmitted radiation beam, the transmitted radiation beam corresponding to a portion of the patterned terahertz radiation beam transmitted through the gap by evanescent-wave coupling.

11. The target device according to claim 1, in combination with a field lens positioned in front of the target device and configured to spatially flatten a wavefront of the incident radiation beam.

12. The target device according to claim 1, wherein the at least one prism assembly consists of a plurality of said prism assemblies, the prism assemblies being spatially distributed such that each of said prism assemblies defines one of the resolution features of the terahertz resolution pattern.

13. The target device according to claim 1, wherein the at least one prism assembly consists of a plurality of said prism assemblies arranged in a bidimensional array.

14. The target device according to claim 1, wherein the at least one prism assembly consists of a plurality of said prism assemblies, the target device comprising a cylindrical holder, the prism assemblies being mounted on an outer surface of said cylindrical holder.

15. A target device for characterizing a terahertz imaging system under test using terahertz radiation, the target device comprising:
   a terahertz resolution pattern having spatially distributed resolution features configured to transmit or to reflect the terahertz radiation;
   at least one prism assembly coupled to the terahertz resolution pattern, each of the at least one prism assembly being arranged in a Frustrated Total Internal Reflection (FTIR) configuration and comprising:
a first prism made of a material having a first refractive index $n_1$ for said terahertz radiation, the first prism having outer interfaces and a first FTIR interface $i_1$, one of the outer interfaces of the first prism defining an input interface of said prism assembly, said input interface being positioned to receive an incident terahertz radiation beam; and
a second prism made of a material having a second refractive index $n_2$ for said terahertz radiation, the second prism having outer interfaces and a second FTIR interface $i_2$,
wherein the FTIR configuration comprises the first FTIR interface $i_1$ and the second FTIR interface $i_2$ facing each other and separated by a gap having a variable width; and
wherein the terahertz resolution pattern is provided along one of the outer interfaces of the first prism of each of the at least one prism assembly and extends across a path of a reflected radiation beam corresponding to a portion of the incident terahertz radiation beam transmitted through the input interface and then reflected by the first FTIR interface, the spatially distributed resolution features reflecting the reflected radiation beam;
whereby when in use to characterize the terahertz imaging system under test with said terahertz radiation, said target device provides contrast images of the resolution features with a variable contrast determined by the variable width of the gap.

16. The target device according to claim 15, wherein the variable width of the gap is defined by a fixed variation of a distance between the first FTIR interface and the second FTIR interface.

17. The target device according to claim 15, wherein the variable width of the gap is defined by an adjustable variation of a distance between the first FTIR interface and the second FTIR interface.

18. A target device for characterizing a terahertz imaging system under test using terahertz radiation, the target device comprising:
a terahertz resolution pattern having spatially distributed resolution features configured to transmit or to reflect the terahertz radiation;
at least one prism assembly coupled to the terahertz resolution pattern, each of the at least one prism assembly being arranged in a Frustrated Total Internal Reflection (FTIR) configuration and comprising:
a first prism made of a material having a first refractive index $n_1$ for said terahertz radiation, the first prism having outer interfaces and a first FTIR interface $i_1$, one of the outer interfaces of the first prism defining an input interface of said prism assembly, said input interface being positioned to receive an incident terahertz radiation beam; and
a second prism made of a material having a second refractive index $n_2$ for said terahertz radiation, the second prism having outer interfaces and a second FTIR interface $i_2$,
wherein the FTIR configuration comprises the first FTIR interface $i_1$ and the second FTIR interface $i_2$ facing each other and separated by a gap having a variable width, and
wherein the terahertz resolution pattern is provided along one of the outer interfaces of the second prism of each of the at least one prism assembly and extends across a path of a transmitted radiation beam corresponding to a portion of the incident terahertz radiation beam transmitted through the input interface and then transmitted through the gap by evanescent-wave coupling, the spatially distributed resolution features reflecting the transmitted radiation beam;
whereby when in use to characterize the terahertz imaging system under test with said terahertz radiation, said target device provides contrast images of the resolution features with a variable contrast determined by the variable width of the gap.

19. The target device according to claim 18, wherein the variable width of the gap is defined by a fixed variation of a distance between the first FTIR interface and the second FTIR interface.

20. The target device according to claim 18, wherein the variable width of the gap is defined by an adjustable variation of a distance between the first FTIR interface and the second FTIR interface.

* * * * *